United States Patent [19]

Edwards

[11] 4,031,832

[45] June 28, 1977

[54] PLANTING SYSTEM

[75] Inventor: Bryant Edwards, Clarendon Hills, Ill.

[73] Assignee: Illinois Tool Works Inc., Chicago, Ill.

[22] Filed: Mar. 26, 1976

[21] Appl. No.: 670,918

Related U.S. Application Data

[63] Continuation-in-part of Ser. No. 538,295, Jan. 2, 1975, abandoned, and a continuation-in-part of Ser. No. 587,561, June 20, 1975, abandoned, and a continuation-in-part of Ser. No. 611,111, Sept. 8, 1975, abandoned.

[52] U.S. Cl. .................................. 111/4; 47/66; 47/73; 47/77; 111/1; 111/92

[51] Int. Cl.² ...................... A01C 11/02; A01G 9/10

[58] Field of Search ............... 47/34 R, 34 A, 34 S, 47/37, 34.13, 34.11, 48.5, 56, 66, 73, 77, 78, 74, 84; 111/1–4, 92, 99, 4; 206/497

[56] References Cited

UNITED STATES PATENTS

| 695,484 | 3/1902 | Parker | 47/34.13 |
|---|---|---|---|
| 780,118 | 1/1905 | Mosier | 47/34 |
| 1,964,689 | 6/1934 | Quillen et al. | 47/37 |
| 2,137,855 | 11/1938 | Otwell | 47/34.11 |
| 2,380,721 | 7/1945 | Brigden | 47/48.5 |
| 2,394,192 | 2/1946 | Mann | 47/37 |
| 2,758,419 | 8/1956 | Schmitz | 47/37 |
| 2,793,470 | 5/1957 | Hallum | 47/37 |
| 2,949,699 | 8/1960 | Lapetina et al. | 47/37 |
| 3,080,680 | 3/1963 | Reynolds et al. | 47/37 |
| 3,126,847 | 3/1964 | Morris | 111/92 X |
| 3,162,981 | 12/1964 | Miller | 47/37 X |
| 3,259,235 | 7/1966 | Sowle | 206/497 |
| 3,517,629 | 6/1970 | Bridges et al. | 111/4 UX |
| 3,755,962 | 9/1973 | Walters et al. | 47/34 R |
| 3,797,417 | 3/1974 | Hahn | 111/92 X |
| 3,835,986 | 9/1974 | LeBeau | 206/497 X |
| 3,962,822 | 6/1976 | Walters | 47/37 |

FOREIGN PATENTS OR APPLICATIONS

| 172,524 | 9/1952 | Austria | 47/34 R |
|---|---|---|---|
| 957,207 | 11/1974 | Canada | 47/37 |
| 366,735 | 2/1932 | United Kingdom | 47/37 |

Primary Examiner—Edgar S. Burr
Assistant Examiner—Steven A. Bratlie
Attorney, Agent, or Firm—Edward L. Benno; Robert W. Beart

[57] ABSTRACT

A planting system including a growing container which is inserted into the ground absent wall portions thereof and from which the plant growing in the remaining portions in the ground may grow into a mature plant, such, for example, as a tree. The container comprises a frame and a thin removable and discardable sleeve in all embodiments. The planting system further includes methods of planting the containers. Also, hand tools for planting the containers are disclosed.

45 Claims, 44 Drawing Figures

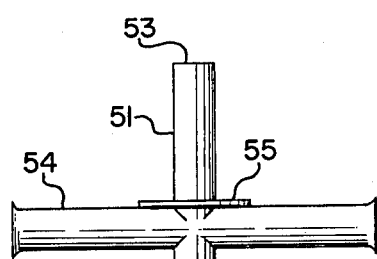
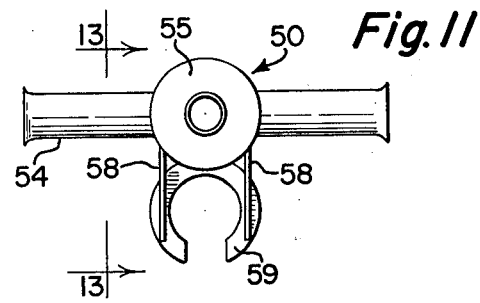
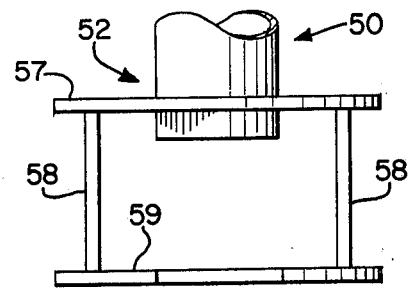
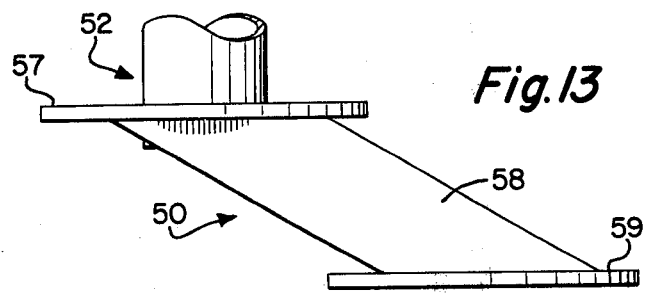
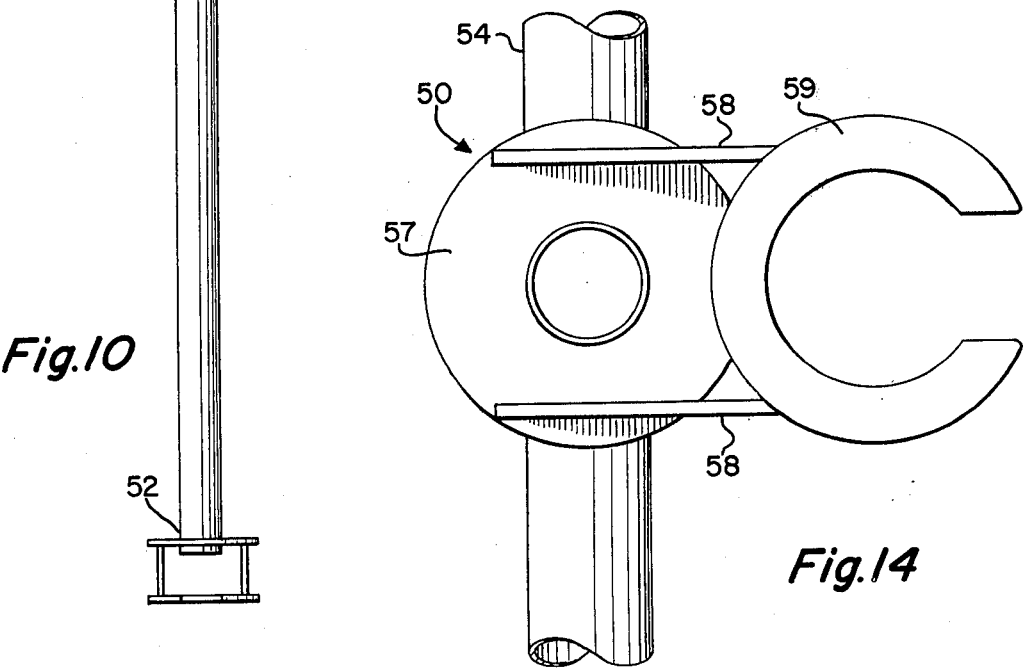

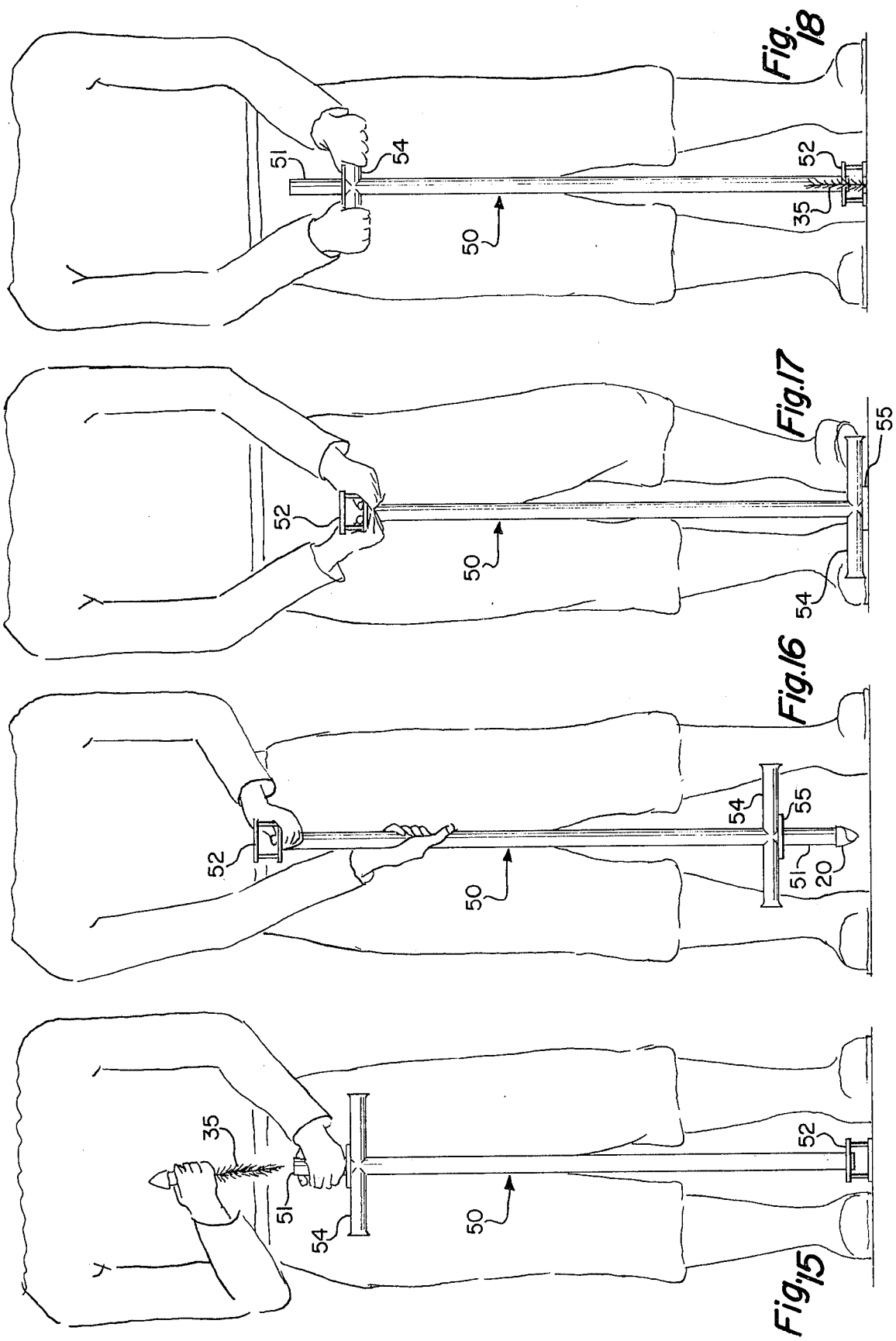

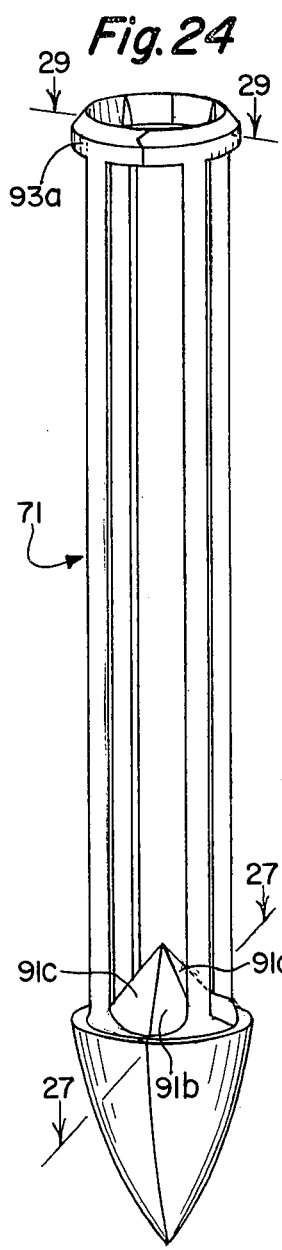
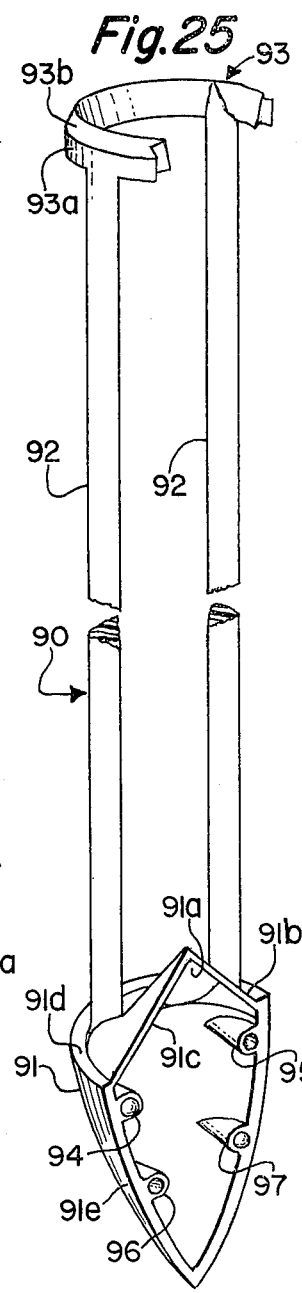
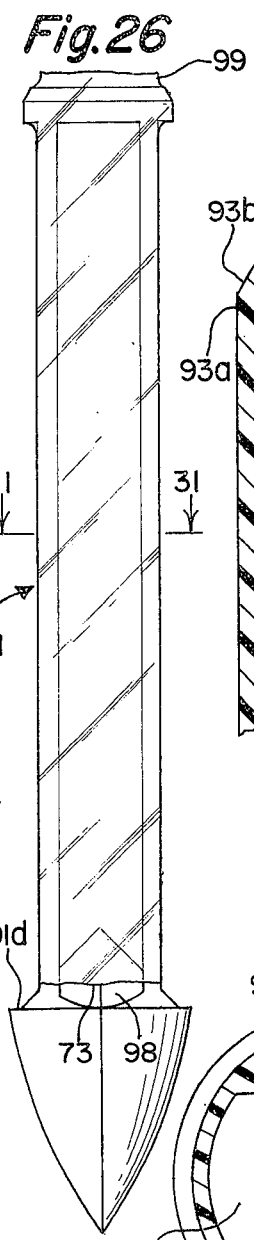
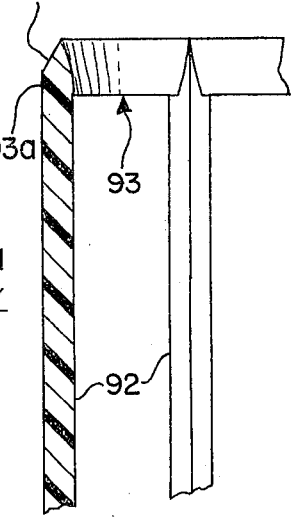
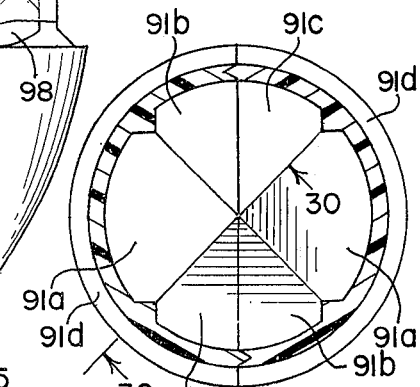
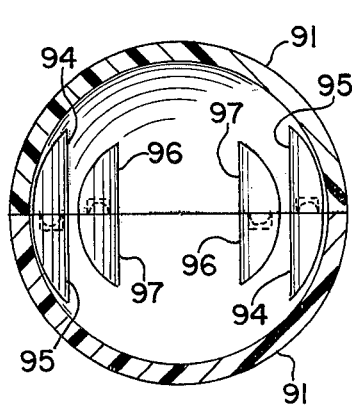
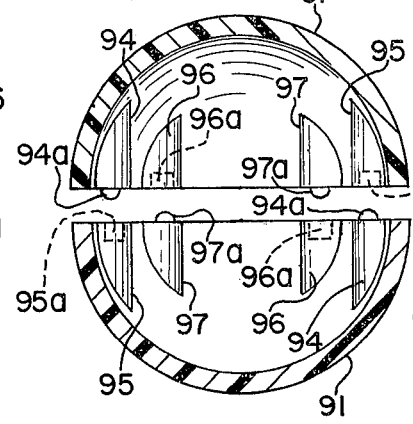
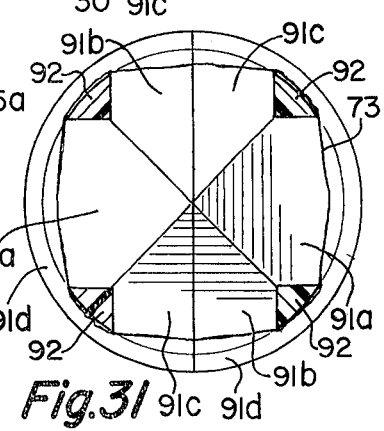

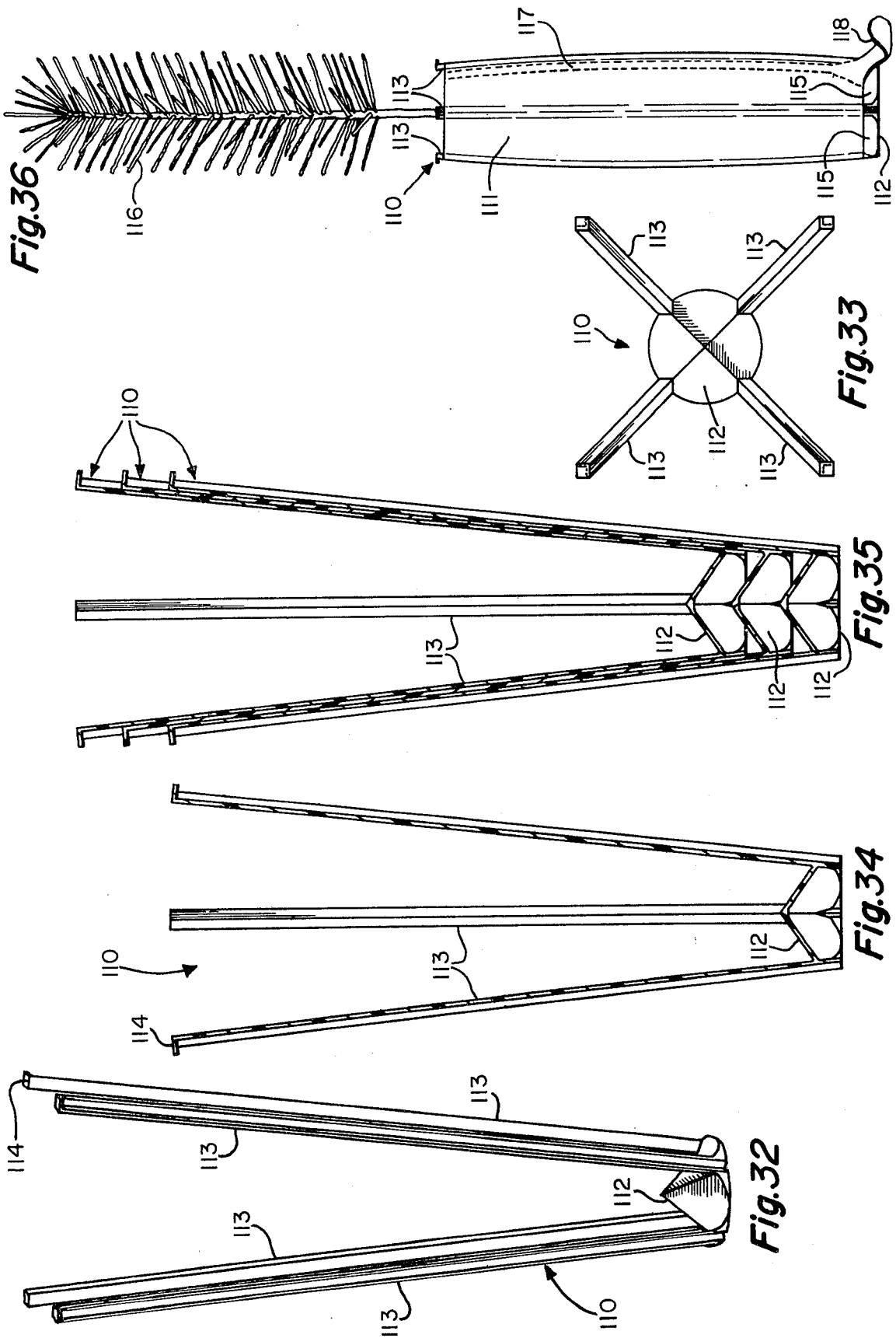

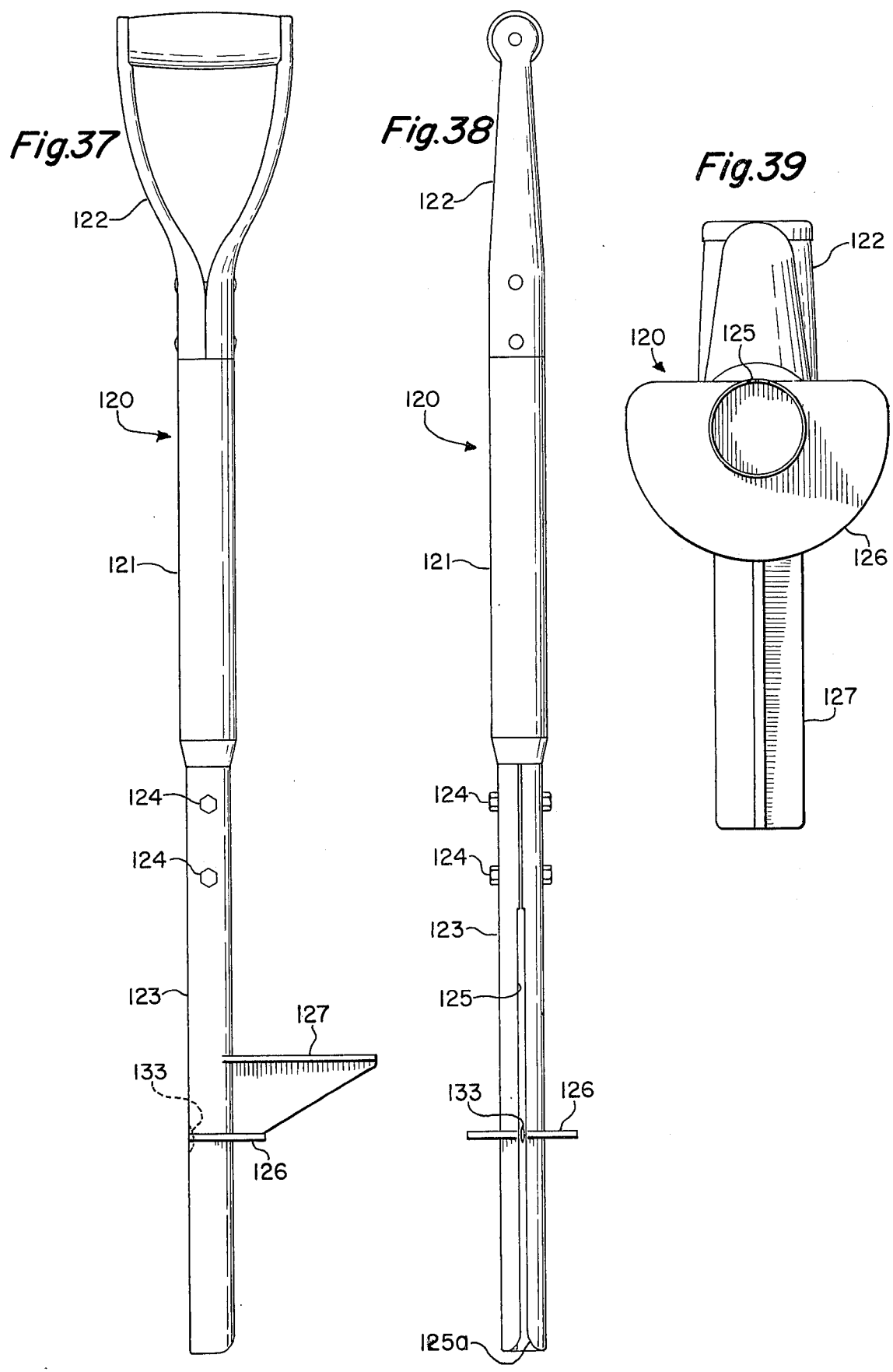

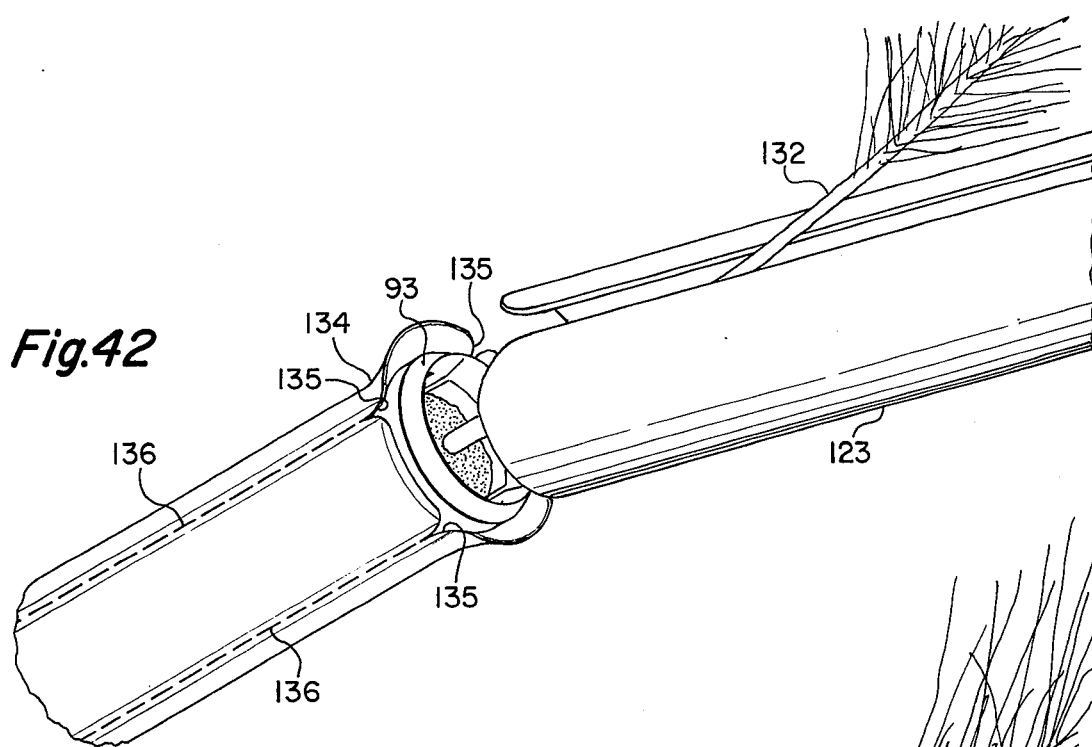
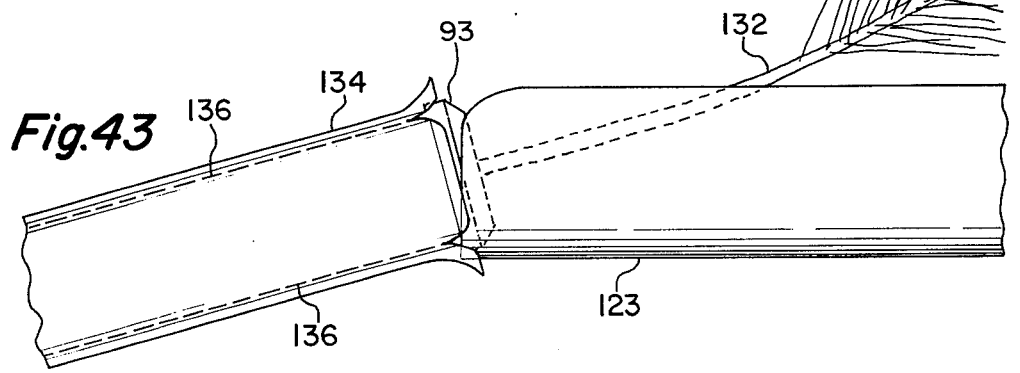
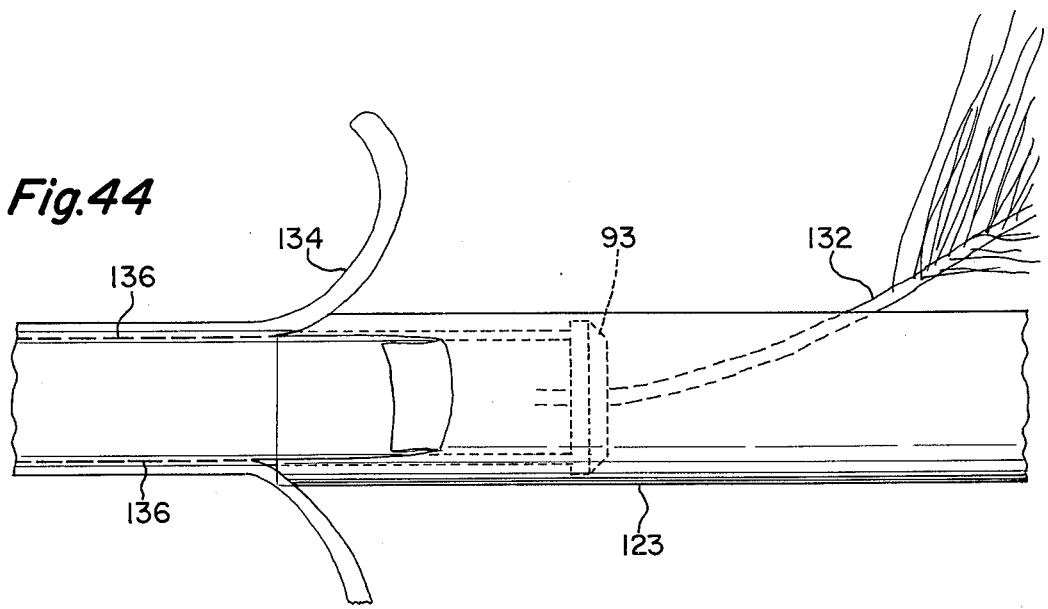

PLANTING SYSTEM

BACKGROUND OF THE INVENTION

This application is a Continuation-in-Part application of my prior filed co-pending applications Ser. No. 538,295 which was filed Jan. 2, 1975, Ser. No. 587,561 which was filed June 20, 1975, and Ser. No. 611,111 which was filed Sept. 8, 1975 all of which are now abandoned.

Containers of various types in which plants may be grown for later transplanting are known in the prior art. Many of those containers have provided for satisfactory growth of the plant from seed to a seedling stage or from a cutting to an adequately rooted cutting in a nursery or greenhouse, but have proved inadequate when, in an effort to maintain the root mass intact, the seedling or rooted cutting and the container, or some part of the container with the plant growing therein, have been transplanted into the open ground. Various reasons appear for the inadequacy of prior art containers which are intended to be transplanted or planted in the open ground. In some prior art arrangements, plants with tender roots are substantially incapable of growing out or through the container even when the container wall is of a porous or fragile material such as paper or compressed peat moss. In other prior art containers, the roots of the plant may find substantially open paths along which they may grow out of the container, but often with a resulting substantial setback in growth compared to the normal growing cycle of such a plant growing in open ground without being confined by such a container. With many plants, transpiration or the process of finding water must occur within an hour of outplanting if the plant is to continue growing in a normal healthy fashion. In other known prior art containers, the container configurations are such that the roots of many plants will be caused to spiral during their initial growth in such containers in a greenhouse or in attempting to grow out of such containers into the adjacent open ground, and the spiraling of the roots may result in a serious setback in the growth rate of the plant. In still other prior art containers intended to be planted in the open ground with a seedling or cutting growing therein, the container presents wall surfaces which, when engaged by a growing root, will direct the root in its further growth in a upward direction rather than in a normal radially outward and downward direction. Such upward growth of the roots of many plants seriously retard the plant in its normal growth and in some instances will cause the plant to mature as a miniature of a normal plant. In still other prior art containers, which might constitute a frame which may be inserted in open ground, drainage openings are provided for the greenhouse stage of growth of a plant, and those openings will have a complete periphery such that roots may grow therethrough with a consequential detrimental effect on the growth of the plant. In still other prior art containers which may provide some type of frame, the base of the frame is not closed so that when the frame is pushed or inserted into the ground, the ground can react against the plant root mass through the base of the frame to prevent or interfere with the insertion of the plant and frame together into the ground.

SUMMARY OF THE INVENTION

Against the foregoing background, the planting system of the subject invention includes a basic plant cartridge or container that initially comprises two members—a skeletal frame member and a sleeve. The skeletal frame member comprises a base section and a plurality of ribs or elongated wall portions secured in spaced-apart relationship about the periphery of the base section and upstanding therefrom. In a preferred form the base section of the frame member is a closed surface devoid of any openings capable of passing water therethrough. That construction avoids a situation where a plant root might attempt to grow into or through an opening in the base section and thereby be effectively strangled in its confinement by the peripheral walls of the opening. The sleeve member in a preferred embodiment is formed from a thin flexible material and encircles the ribs of elongated wall portions of the frame member. The lower end of the sleeve is spaced from the base of the frame to provide, in cooperation therewith, suitable drain openings for the container. In that condition the cartridge is a complete plant growing container which may be arranged in an upright position in large numbers in trays or racks in a greenhouse. Each cartridge may be filled with an appropriate growing medium and a seed or cutting of the plant to be grown.

The container of the invention may be used to grow many different types of plants which are preferably first grown from a seed to a seedling stage, or grown from a cutting to a rooted cutting, in a greenhouse or other facility and thereafter transplanted or planted in the open ground. As an example, plants which may be grown in the container of the subject invention are various conifers which are commercially grown for use in reforestation programs. For such uses, the complete container is filled with a suitable growing medium to a level a short distance below the upper edge of the sleeve member. A conifer seed is than placed upon the growing medium and, conveniently, a small amount of gravel may be deposited over the seed to firmly hold the seed against the growing medium.

Under proper growing conditions of moisture, nutrients and light, a seed in the container will germinate, or a cutting inserted into the growing medium will root, sending developing roots downward through the growing medium and top growth upwardly out of the container. After a suitable time period, which may be about six months for some types of conifers started from seed, the container will have a substantial mass of roots therein. The roots in growing downward and radially outwardly, will, of course, contact the ribs and sleeve and will be substantially prevented by the ribs from spiralling. Any excess water applied to the container will drain from the lower end thereof between the base of the container and the lower edge of the sleeve.

In the preferred embodiments of the invention, the base section of the frame is also domed upwardly and as plants are grown in the container for a length of time sufficient to enable the roots to reach the dome of the base section, those roots will be directed by the dome radially outwardly and downwardly toward the drainage openings. Air pruning of the roots may occur at the drainage openings.

The next step in the use of the container of the invention is to carry the container to a desired ground site for further growth thereat. The sleeve member is then stripped from the container to expose the root mass and growing medium and, using the ekeletal frame member as a support for the root mass and growing medium, the frame member and plant growing therein are inserted in the open ground. Essential to the invention is that the skeletal frame member be planted in the ground with the plant and absent the sleeve. Although the sleeve member may be stripped from the container prior to any planting of the skeletal frame, the invention contemplates that removal of the sleeve may occur contemporaneously with the planting operation. The container in one of its basic forms can be planted by merely pushing it into the ground if the soil is soft enough, or by opening a hole in the ground with a dibble and inserting the skeletal frame in the prepared hole and thereafter tamping the soil about the planted skeletal frame.

Another basic form of the skeletal frame of the container of the subject invention contemplates a shoulder extending radially outwardly of the base section of the skeletal frame. With that construction a planting tool which basically comprises a simple tube capable of encircling the ribs with the growing medium and root structure growing therein and with the lower end of the tool in vertical abutment of the shoulder. If the soil at the out-planting site is sufficiently soft, the tool can be used to push the skeletal frame without a bullet-shaped nose within the ground. The tubular tool may then be withdrawn from the ground leaving the skeletal frame and the plant growing therein planted in the ground. The ground may then be tamped about the plant. It is contemplated that the planting tool may be a simple hand operated tool or part of a machine for high speed plantation planting of the containers.

An important further embodiment of the invention is the construction of the shoulder as a substantially annular shoulder having a radial width greater than the outer diameter of the tubular planting tool. With that arrangement, and even when the shoulder width exceeds the outer diameter of the tubular planting tool by only a few thousandths of an inch, the extreme outer edge of the shoulder will tend to firmly anchor the skeletal frame in the ground. A further advantage of that arrangement is that the shoulder on the base section of the skeletal frame opens a hole in the ground greater than the diameter of the planting tool so that the outer surface of the tubular tool is substantially free of soil compacted thereagainst and the tool can be withdrawn from the ground in a relatively clean condition, particularly when planting is done in relatively heavy soils or soils having a high clay content.

The invention further contemplates that the underside of the base section of the skeletal frame of the container may be provided with a bullet-shaped or ground penetrating nose configuration to aid in pushing the skeletal frame with the plant therein into the ground, particularly when the soil at the out-planting site is heavy and compacted.

When the skeletal frame member and the plant have been planted in the ground, absent the sleeve member, the roots of the plant may immediately grow radially outwardly between the relatively widely spaced ribs of the frame member and into the adjacent soil. The planted skeletal frame member will have substantially no detrimental effect on the growth of most plants growing out of the frame member. The embodiment of the base of the skeletal frame in which the base has a domed upper surface is particularly advantageous for the growing of plants such as trees which have substantial tap roots, because the tap roots of such plants in growing downwardly are directed by the domed shape of the upper surface of the base section outwardly and downwardly of the base section to provide for a minimum disturbance in the normal pattern of root growth of the tap roots of such plants.

From the foregoing summary, it may be seen that the primary object of the present invention is to provide a container in which a plant may be grown from seed to a seedling stage or from a cutting to a rooted cutting stage, and which may thereafter be used, absent a substantial wall portion, to support the root mass and growing medium of the plant for transplanting in the open ground with a minimum of disturbance of the root mass and growing medium in the planting operation and in the subsequent growth of the roots of the plant out of the remaining portion of the container and into the adjacent soil.

Other objects and features of the invention will be apparent upon the perusal of the hereinafter following detailed description read in conjunction with the drawings.

IN THE DRAWINGS

FIG. 10 is a side elevational view of one embodiment of the planting tool of the subject invention;

FIG. 11 is a top plan view of the tool of FIG. 10;

Figure 19:
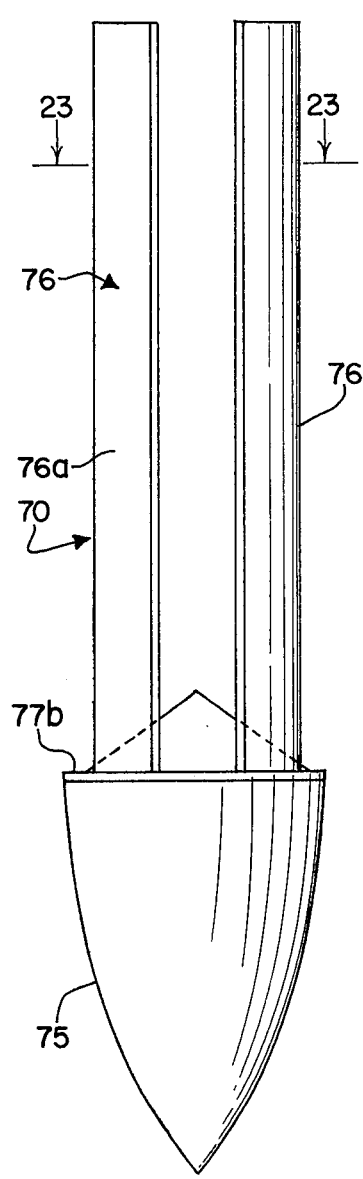
Figure 20:
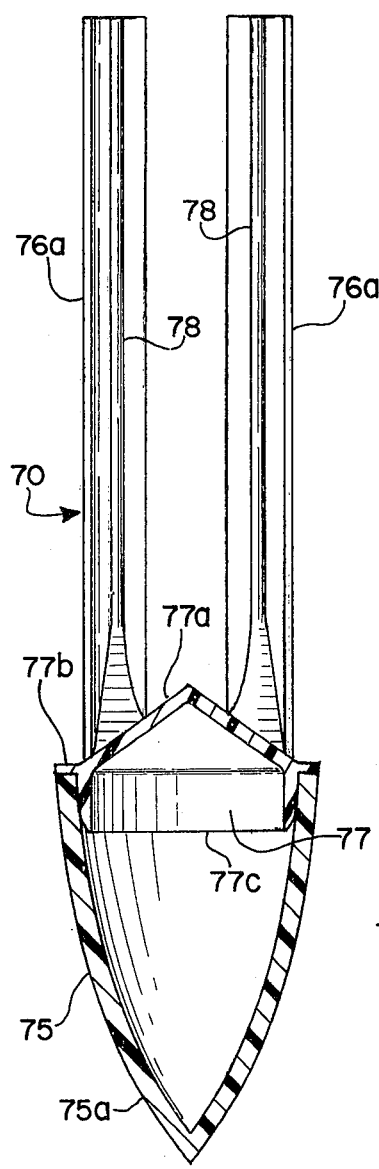
Figure 21:
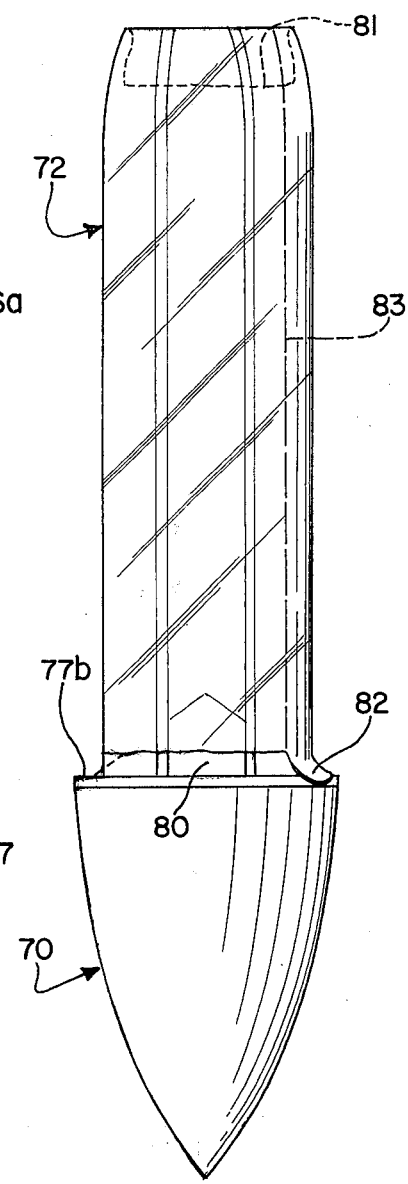
Figure 22:
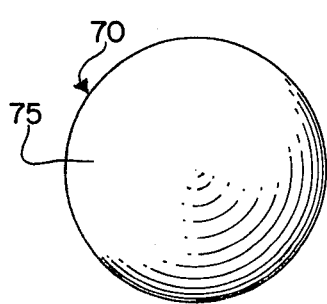
Figure 23:
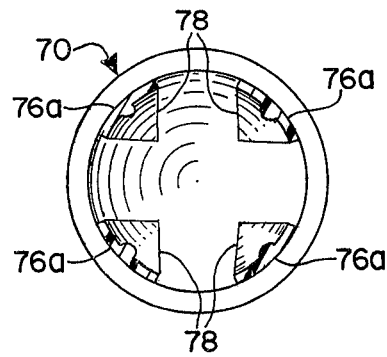

FIG. 12 ia an enlarged view of the lower end of the tool of FIG. 10;

FIG. 13 is an enlarged view of the lower end of the tool shown in FIG. 12, but taken substantially along the line 13—13 of FIG. 11;

FIG. 14 is an enlarged bottom plan view of the tool of FIG. 10;

FIG. 15 is a view showing a person inserting a cartridge member of one of the embodiments with the sleeve member removed into the tool;

FIG. 16 shows a person having turned the tool with the inserted cartridge and seedling end-for-end preparatory to planting the seedling and cartridge;

FIG. 17 shows a person gripping the tool and having pressed the lower end of the tool into the ground with one foot;

FIG. 18 shows a person having removed the lower end of the tool from the ground, having again reversed the tool end-for-end, and tamping the planted seedling and cartridge;

FIG. 19 is a side elevational view of another embodiment of the cartridge member of the present invention;

FIG. 20 is a vertical cross-sectional view of the structure shown in FIG. 19;

FIG. 21 is a side elevational view of the completed cartridge of FIG. 19 including a sleeve;

FIG. 22 is a bottom end view of the structure shown in FIG. 19;

FIG. 23 is a cross-sectional view of the structure shown in FIG. 19 and taken substantially along the line 23 — 23 of FIG. 19;

FIG. 24 is a substantially isometric view of another embodiment of the cartridge member of the subject invention;

FIG. 25 is a slightly enlarged isometric view of one of the two parts that make up the cartridge member of FIG. 24;

FIG. 26 is a side elevational view of the completed cartridge including the cartridge member of FIG. 24 and a sleeve;

FIG. 27 is an enlarged cross-sectional view of the nose portion of the cartridge member as shown in FIG. 24 and taken substantially along the line 27—27 of FIG. 24;

FIG. 28 is a view similar to FIG. 27, but with the parts of the nose portion slightly separated;

FIG. 29 is an enlarged cross-sectional view of the structure shown in FIG. 24 and taken substantially along the line 29 — 29 of FIG. 24.

FIG. 30 is an enlarged fragmentary view of the structure shown in FIG. 24 such as taken substantially along the line 30 — 30 of FIG. 29; and FIG. 31 is an enlarged cross-sectional view of the structure shown in FIG. 26 and taken substantially along the line 31 — 31 of FIG. 26.

Figure 40:
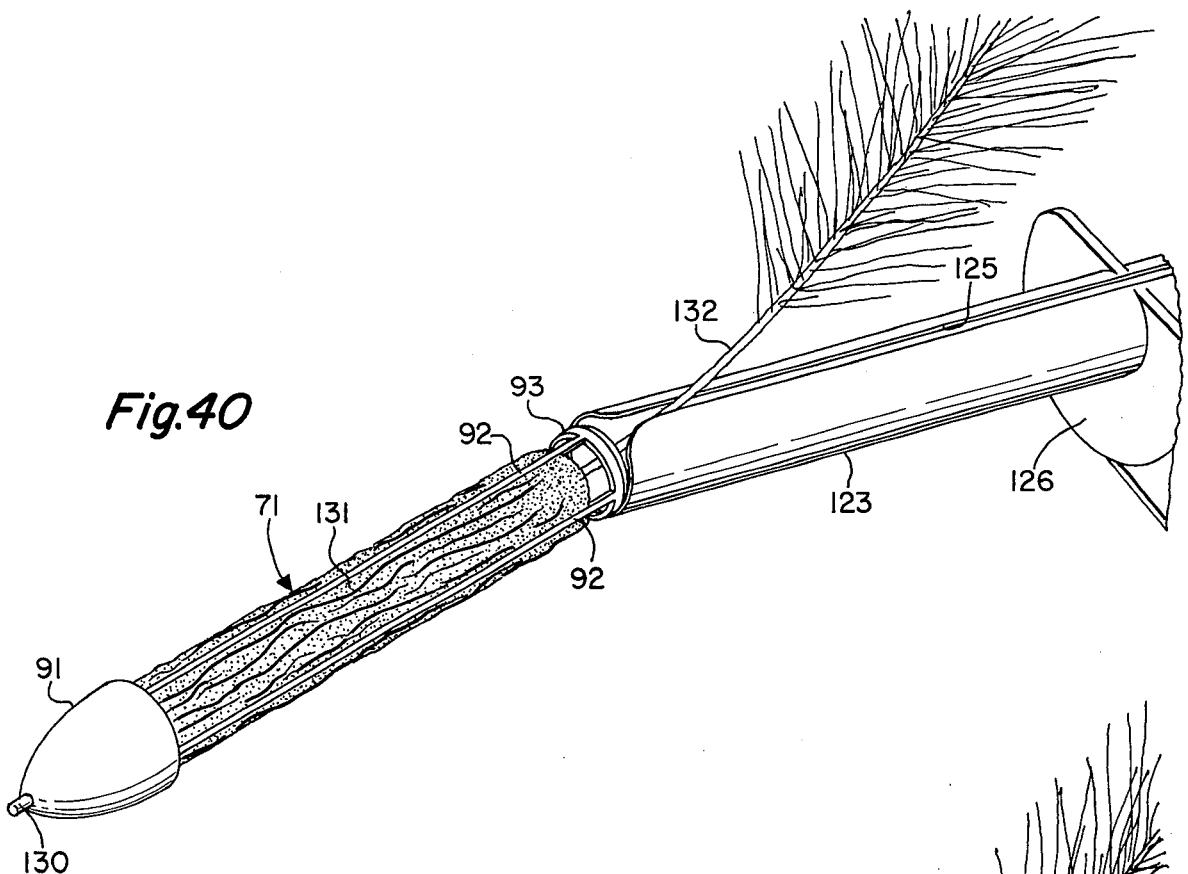
Figure 41:
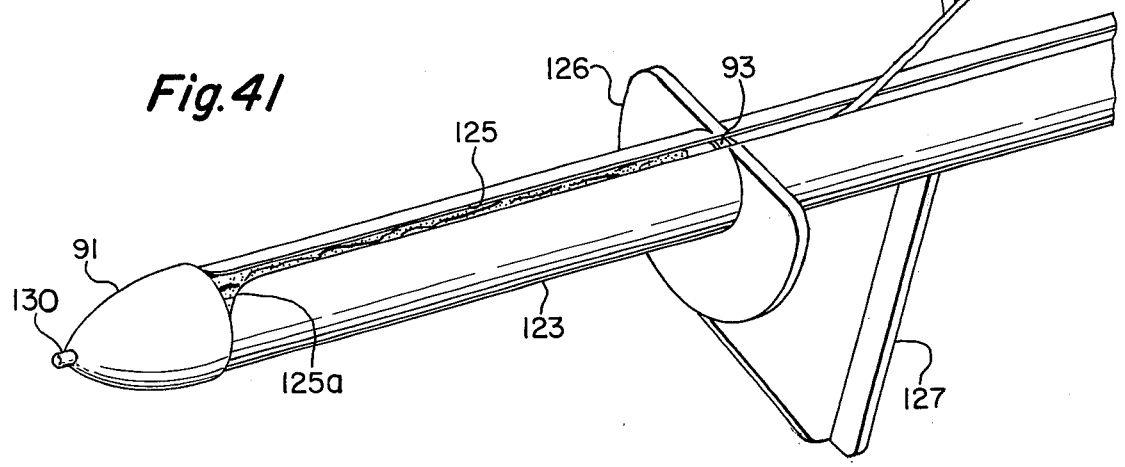

FIG. 32 is an isometric view of another embodiment of the frame member of the container of the subject invention;

FIG. 33 is a top plan view of the frame member of FIG. 32;

FIG. 34 is a side elevational view of the frame member of FIG. 32 in cross section;

FIG. 35 is a view of a plurality of frame members, such as shown in FIG. 34, showing the manner in which the frame members may be nested;

FIG. 36 is a side elevational view of a frame member, such as shown in FIGS. 32 – 35, including the sleeve to produce the container of the subject invention and further showing by way of example a conifer seedling growing in the container;

FIG. 37 is a side elevational view of another embodiment of the planting tool of the subject invention;

FIG. 38 is another side elevational view of the tool of FIG. 37 taken from the side opposite that having the foot rest;

FIG. 39 is an enlarged bottom plan view of the tool of FIGS. 37 and 38;

FIG. 40 is an isometric view of the end of a tool such as shown in FIGS. 37 – 39, showing how one of the containers of the invention with a plant growing therein is initially inserted into the planting tool;

FIG. 41 is a view similar to FIG. 40, but showing the container completely inserted into the planting tool;

FIG. 42 is a view similar to FIG. 40, but showing a modified form of sleeve that may be contemporaneously removed with the insertion of the container frame into the tool;

FIG. 43 is a side elevation view of the arrangement shown in FIG. 42 showing the exterior engagement of the tool by the sleeve; and FIG. 44 is a view similar to FIG. 43, but showing the container as having been partially inserted into the tool.

DETAILED DESCRIPTION OF THE PREFERRED EMBODIMENTS

Figure 1:
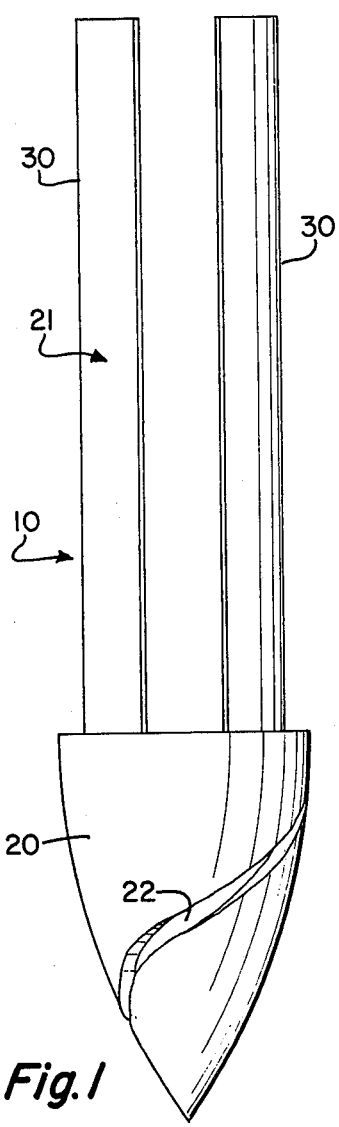
FIG. 1 is a side elevational view of one embodiment of the cartridge member.
Figure 4:
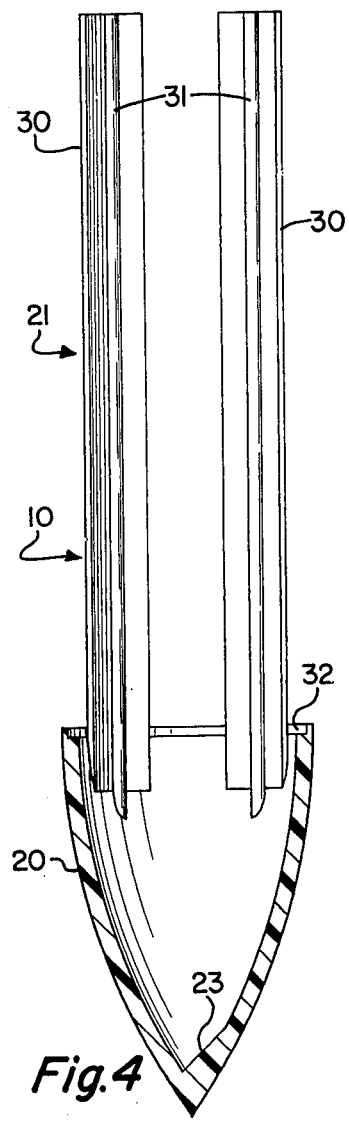
FIG. 4 is a cross-sectional view of the cartridge member of FIG. 1.
Figure 5:
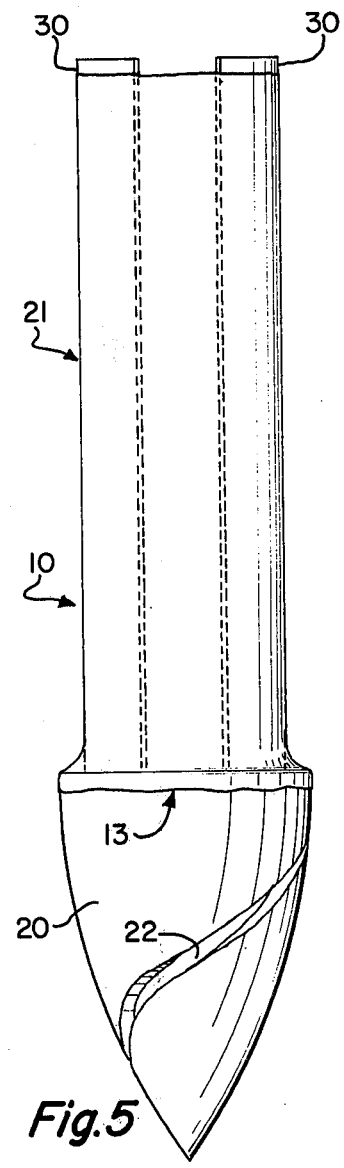
FIG. 5 is an elevational view of a cartridge member as shown in FIG. 1, but with one embodiment of the sleeve member on the cartridge member.
Figure 6:
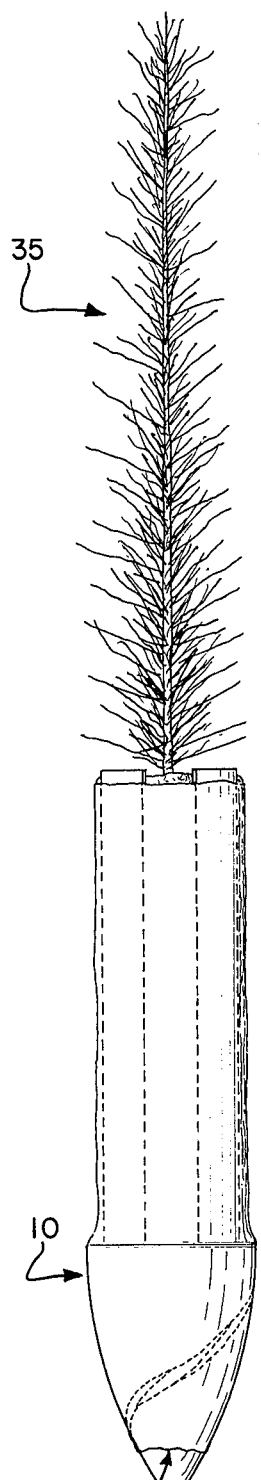
FIG. 6 is a view of the cartridge member of FIG. 1 with another embodiment of the sleeve member and showing a seedling growing therein.

The cartridge or container of the present invention in the preferred embodiments shown in the drawings and further described hereinafter comprises a frame member 10 such as shown in FIGS. 1 – 6, or frame members 11 or 12 as respectively shown in FIGS. 7 and 9, or frame member 70 shown in FIGS. 19 – 23, or frame member 71 shown in FIGS. 24 and 31, or frame member 110 shown in FIGS. 32 – 36, and a sleeve member such as sleeve member 13 shown in FIG. 5, or sleeve member 14 as shown in FIG. 6, or sleeve member 72 as shown in FIG. 21, or sleeve member 73 shown in FIG. 26, or sleeve member 111 shown in FIG. 36. The frame members can be molded or otherwise formed of any suitable material or composite materials having sufficient strength for the intended uses of the frame and further of materials that would not be injurious to the roots of a growing plant in contact therewith. The invention contemplates that in some instances the frame members may be formed of or include substances which will aid good root growth of the plant growing therein. In a preferred embodiment, it is contemplated that the frame members be injection molded of a thermoplastic material such, for example, as polystyrene. Further, the plastics material may function as a binder with other inert or fertilizing fibers or granules of appropriate substances. It is further contemplated that in composite form the material of the frame or parts thereof may include or otherwise be treated with a substance which will repel or destroy animals, insects or other organisms that might be injurious to the plant during its growth period in the cartridge. It is further contemplated that the material of the frame members may also be made of a material that will degrade after some extended period, such as after one to three years, so that during the initial manufacture, storage and use of the container in a greenhouse no degradation will occur.

Essentially, the frame member is configured; firstly, to provide in combination with the sleeve member an efficient growing container for a plant from seed to the seedling stage; secondly, to function as a vehicle for projecting or planting the seedling without the sleeve into the ground for further growth out of the container and into the ground; and, thirdly, to provide in such a container and projectile, an arrangement which will not adversely affect root growth of the plant out of the frame into the ground and particularly which will permit both root growth of the lateral roots of the plants and growth of the tap root or roots of the plant with substantially no restriction upon tap root growth in directions generally outwardly and downwardly out of the frame. In respect to the tap roots of the plant the frame is configured to avoid any tendency to direct the tap roots to grow either in the frame or out of the frame in the ground in an upwardly direction. Further, the frame is configured to prevent spiraling of the roots growing therein.

As may be seen in FIGS. 1 – 4, the frame member 10 comprises a nose section 20 and a shank section 21.

The nose section 20 is formed as a hollow member tapering substantially to a point at its lower end. The wall of the nose section 20 is of a thickness sufficient to enable the frame member 10 to be projected into the ground in a planting operation without destruction of the nose section 20 by reaction forces of the soil against the nose section 20. The wall of the nose section 20 is provided with an open slot 22 which extends from the upper end of the nose section 20 to a point substantially adjacent the tip, as may be seen in FIGS. 2 and 3. Thus, the nose section 20 is circumferentially discontinuous in every horizontal plane therethrough from its upper end to its lower tip, except for a small circumferential area at the extreme tip portion thereof. That construction is believed important because the nose section 20 is thus absent of any circumferentially complete band portion that would function to restrict root growth of a seedling growing therein.

Figure 2:
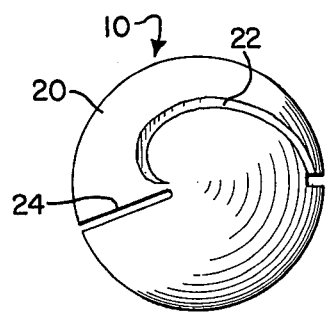
FIG. 2 is a bottom plan view of the cartridge member of FIG. 1.
Figure 3:
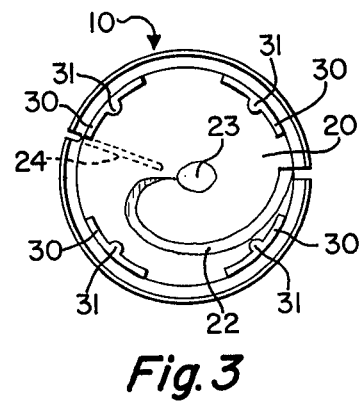
FIG. 3 is a top plan view of the cartridge member of FIG. 1.

The nose section 20 is further formed so that the slot 22 extends circumferentially thereabout in a spiral fashion from the upper end of the nose section 20 to a point substantially adjacent the tip. The effect of the spiral-shaped slot 22 is to present virtually a closed surface to the nose section 20 when it is viewed from the tip as seen in FIG. 2. Thus, the spiral slot 22 serves to avoid soil, in which the frame is projected, from tending to move into the slot 22 along lines axially of the frame member 10 as the frame member 10 is projected straight downwardly into the soil in the planting operation.

Because the lower end of the slot 22 terminates substantially adjacent to the extreme tip of the nose section 20, the tap root of a seedling growing in the frame member 10, when the frame member 10 is planted in the ground, can grow out of the tip area of the nose section 20 in a substantially vertically downward direction. Thus, the frame member 10 will substantially avoid any tendency to cause the tap root to curve back upon itself in growing. The inner lower wall area of the nose section 20 is further formed to have an inclined and somewhat flattened planar portion 23 aligned relative to the lower end of the slot 22 to further aid in directing a tap root growing thereagainst toward the lower open end of the slot 22.

Further, concerning the material of the frame member 10, it should be understood that it is preferred that the material be sufficiently structurally weak so that a growing tap root in the nose section 20 will easily fracture or otherwise open the nose section 20 by a horizontal spreading of the opposed walls defining the slot 22. If desired, the nose section 20 may be provided with one or more vertically extending lines of weakness such as groove 24 of FIG. 2. The groove 24 is disposed in the nose section 20 generally diametrically opposed from the slot 22. The wall thickness of the nose section 20 in the bottom of the groove 24 is such that as the roots of the plant grow within the nose section 20, the wall portions on each side of the slot 22 are easily spread apart in a pivoting or spreading movement about the axis of the groove 24.

The shank section 21 of the frame member 10 comprises four ribs, elongated members, or wall sections 30 which are integrally formed or connected to the upper end of the nose section 20 to upstand therefrom in a horizontally spaced-apart relationship thereabout. Importantly, the upper end of the slot 22 in the nose section 20 is straddled by two wall sections 30, as may be seen in FIG. 3, so that from the upper end of the frame member 10 to a point adjacent the tip there is no circumferentially continuous band of frame material which might restrict or stunt the growth of a plant growing therein in the ground.

In the preferred embodiment of FIGS. 1 – 5, the wall sections 30 have an arcuate shape in transverse cross section and encircle approximately 50 percent of the circle in which the wall sections 30 lie. That preferred embodiment further includes integrally formed vertical ribs 31 disposed on the inner surface of the wall sections 30. The ribs 31 add rigidity to the wall sections 30 and further serve to prevent spiraling of the roots of a plant growing in the container. The wall sections 30 are further disposed on the inner upper wall area of the nose section 20 to permit the outer upper end of the nose section 20 to function as a flange or shoulder for the end of the planting tool, such as is shown in one embodiment in FIGS. 10 – 14. A preferred embodiment further includes an annular slot 32 within the upper end of the nose section 20 to receive the end of the planting tool therein and prevent the slot 22 from being forced to a closed condition as the frame member 10 is projected into the ground with the planting tool.

As may be seen in FIG. 5, the container of the subject invention further comprises a sleeve 13 which encircles the shank section 21. The sleeve 13 may be formed of various suitable materials and in a preferred embodiment is formed from a thin plastics-material and serves to make the seedling cartridge a complete container for growing a seedling therein. In the preferred embodiment the material of the sleeve 13 is a material commonly known as shrink film in the plastics art and is generally of a thickness of approximately 1 to 4 mil. Such a shrink film may be made in a tubular form which may be loosely applied about the shank section 21 and thereafter subjected to heat to cause the film to shrink snugly about the frame member 10. Depending upon the particular plant being grown in the container, and the particular nursery conditions for holding the containers during growth of the seedling, the lower end of the sleeve 13 may project downwardly over the nose section 20 some selected distance. In FIG. 5 the lower end of the sleeve 13 is shown as terminating a short distance below the upper end of the nose section 20, while in FIG. 6 the sleeve 14 therein is shown as terminating a short distance above the tip of the frame member 10. For some plants, the sleeve arrangement shown in FIG. 5 may be desirable for as its roots tend to grow out of the slot 22 the tips of the roots will die in a self-pruning operation. However, with other plants the sleeve arrangement of FIG. 6 may be more desirable where the complete seedling container resembles a flowerpot in function with a weep hole at the bottom thereof.

Under most nursery conditions, it is desirable that the sleeves 13 or 14 be of an opaque plastics-material to prevent light from passing therethrough to the growing roots within the seedling container. FIG. 6 pictorially shows a conifer seedling 35 growing in a complete seedling container of the subject invention.

Figure 7:
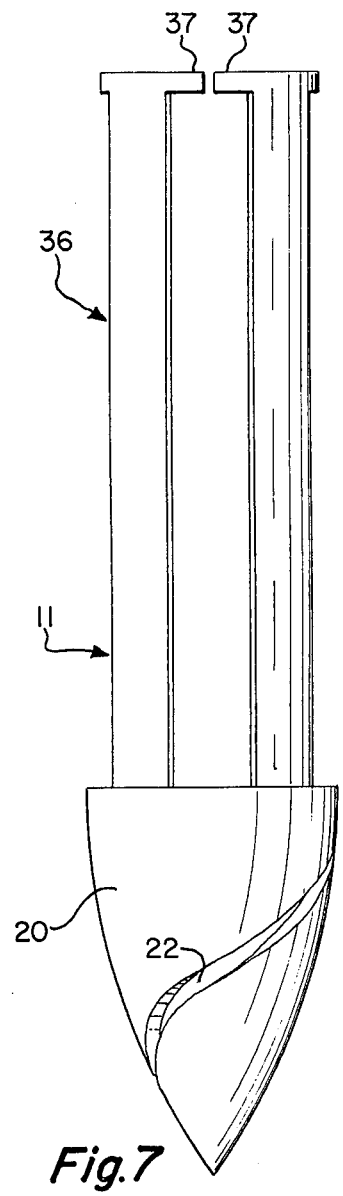
FIG. 7 is a side elevational view of another embodiment of the cartridge member of FIG. 1.
Figure 9:
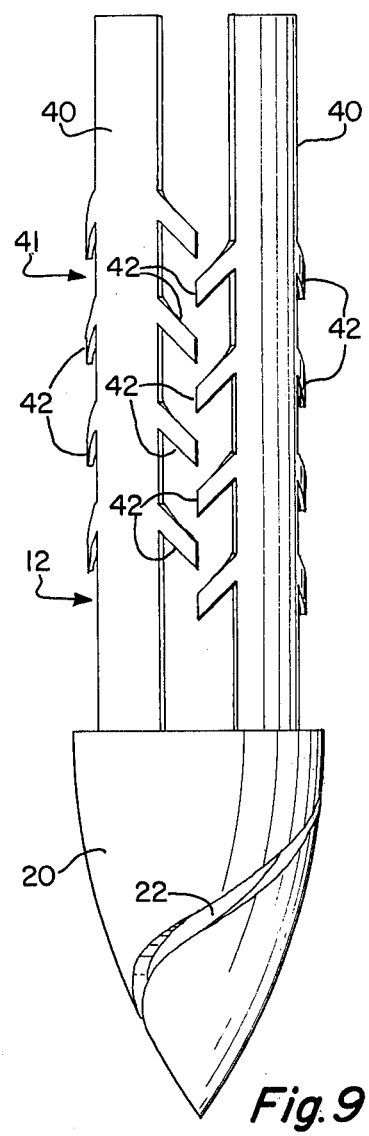
FIG. 9 is a side elevational view of still another embodiment of the cartridge member of FIG. 1.
Figure 8:
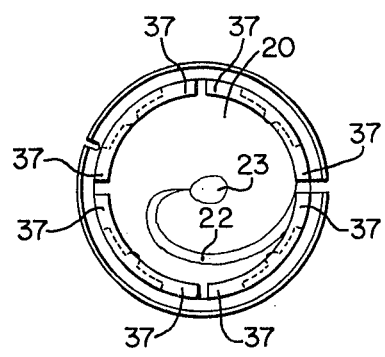
FIG. 8 is a top plan view of the cartridge member of FIG. 7.

The embodiments of FIGS. 7 – 9 have substantially the same construction for the nose sections 20 of the frame members 11 and 12. In the embodiment shown in FIGS. 7 and 8 the shank section 36 differs from the shank section 21 of the embodiment of FIGS. 1 – 5 by the provision of shoulders 37 extending horizontally from the upper ends of the wall sections of the shank section 36. The shoulders 37 are further arranged on the circle defined by the wall sections of the shank section 36, and adjacent shoulders 37 terminate a short distance from each other, as shown in FIG. 7. The embodiment of FIG. 7 is conveniently used where the shank section 36 is so long that a sleeve 13 or 14 in shrinking about the shank section may bend the upper ends of the wall sections of the shank section too closely together. It should be noted that when the sleeve is removed, and a frame member such as frame member 11 is planted, the upper end of the frame member 11 does not have a continuous band that might restrict or choke the seedling growing therein.

The embodiment of FIG. 9 is substantially similar to that of FIGS. 1 – 5, except that the wall sections 40 of the shank section 41 are provided with fingers 42. The fingers 42 are formed on the wall sections 40 to cooperate with the growing medium and roots of a seedling growing therein to prevent the seedling from being accidentally pulled from the ground such as when the lower end of the planting tool is withdrawn from the ground. The number, shape and direction of projection of the fingers 42 may be varied as desired to perform as described. Under some conditions, merely one or two fingers 42 ajacent the upper end of the shank section 41 may be necessary. In some arrangements the fingers 42 may advantageously project radially inwardly of the circle defined by the shank section 41, or in some other instances, the fingers 42 may project inwardly of the shank section 41 along chords of the circle defined by the shank section 41.

One form of tool for planting seedling containers of the subject invention is shown in FIGS. 10 – 18 at 50. End 51 is the planting end of the tool 50 and end 52 is the tamping end of the tool 50. The tool 50 may be formed of a tubular steel stock, and in the alternative the intermediate portions may be formed from wood.

The planting end 51 must be tubular for a length sufficient to receive the shank section and top growth of any seedling 35 therein. The internal diameter of the planting end 51 is substantially equal to the outer diameter of the circle traced by the shank section of the seedling frame. Normally, the shank section of the seedling frame will be loosely frictionally retained within the planting end 51 of the tool 50 so that when the tool 50 is rotated from the position shown in FIG. 15 to that shown in FIG. 16, the seedling cartridge will not fall therefrom. However, under some conditions it may be desirable to form a projection on the outer lower end of one or more of the wall sections of the shank section of the seedling frame to produce further frictional retention of the shank section within the planting end 51 of the tool 50.

The outer diameter of the planting end 51 of the tool 50 is less than the upper outer diameter of the nose section 20 of the frame member. Thus, the edge 53 of the planting end 51 will engage the annular shoulder between the nose section 20 and the shank section of the frame member. Thus, when the tool 50 is held by a person as shown in FIGS. 16 and 17, foot pressure applied by the person to the crossbar 54 of the tool 50 will cause the planting end 51 to project the nose section 20 into the ground with the shank section and top growth of the seedling within the planting end 51. Further, by virtue of the upper outer diameter of the nose section 20 of the frame member being larger than the outer diameter of the planting end 51 of the tool 50, the upper outer edge of the nose section 20 will tend to anchor the frame member in the ground, and that edge will further open a hole in the ground larger than the planting end 51 of the tool so that the planting end 51 may be easily withdrawn from the ground with substantially no adherence of soil to the outer surface of that planting end 51.

A stop member or plate 55 is provided on the planting end 51 of the tool 50. In the embodiment shown, the stop 55 is fixedly secured on the planting end 51 a distance from the edge 53 substantially equal to the length of the shank section of the frame member. If desired, the stop 55 may be mounted by any well-known means (not shown) on the planting end 51 so as to be selectively positionable at different longitudinal positions on the planting end 51 to provide for different planting depths of the frame, and particularly to accommodate frame members having different shank lengths.

The system of the present invention contemplates that when the frame member is planted in the ground with the seedling it will be absent the sleeve to expose the growing medium and root structure between adjacent wall sections of the shank section directly to the soil in which the frame member has been planted. Thus, the laterally growing roots of the plant within the shank section and over fifty percent of the area of the circle traced by the shank section may grow outwardly into the adjacent soil as the seedling continues to grow in its planted location. As the roots of the seedling increase in size into the adjoining soil, the wall sections of the shank section may be pushed out of the way or otherwise fractured and destroyed by the constantly increasing root mass. In the process of planting the frame member without the sleeve member a number of different arrangements may be provided for removing the sleeve member. When a person is holding the seedling container as shown in FIG. 15, the sleeve may be move against a sharp instrument carried either by the person or on the tool 50 to cut, tear or otherwise strip the sleeve from the frame member before the frame member is inserted into the planting end 51 of the tool 50 in a manner as shown in FIG. 15. Alternatively, the planting end 51 of the tool 50 may carry a means (not shown) for strippiing the sleeve from the frame member contemporaneously with the insertion of the cartridge member into the planting end 51 of the tool 50 as shown in FIG. 15 as will be described hereinafter.

After the frame member is planted, as shown in FIG. 17, the planting end 51 is withdrawn from the ground to leave the frame member and seedling in the ground. The tamping end 52 of the tool 50 is then used to tamp the soil about the frame member to ensure that the space in the ground previously occupied by the plant end 51 of the tool 50 is obliterated. In using the tool 50 to tamp the earth about the seedling, the tool 50 is turned end-over-end from the position shown in FIG. 18. It is obvious from a comparison of FIGS. 15 – 18 that when the tool 50 is in the tamping position shown in FIG. 18 it is in the same position as that of FIG. 15 and thus is ready to accept another frame member as is shown in FIG. 15.

The tamping end of the tool 50 comprises a plate or support member 57 secured thereto. A pair of plates 58 are secured to the underside of the support member 57 and extend downwardly and outwardly of the longitudinal axis of the tool 50. A discontinuous ring 59 is secured across the lower ends of the plates 58 as shown in FIGS. 12 – 14. The discontinuous portion of the ring 59 is wide enough to permmit the top growth of the seedling 35 to move therethrough without damage in order to encircle the seedling 35 with the ring 59. The ring 59 has a width sufficient to produce a good tamping of the soil immediately encircling the planted frame member. The axial offset of the ring 59 is sufficient to enable the top growth of the seedling 35 to clear the tool 50 during tamping.

The invention contemplates that if a person can easily tamp the soil about the planted frame with his feet, the tamping portion of the tool 50 may be omitted and the planting end 51 may be duplicated at that end.

In the embodiments of FIGS. 19 – 31 the nose section of the frame member is not internally open to receive the growth of the roots of any plant growing in the container. Although the nose sections of the embodiments of FIGS. 19 – 31 are shown as hollow closed members. the invention contemplates that the hollow space within those nose sections can, in the alternative, be filled with some inert substance if additional rigidity or sealing of the nose sections against the growth of any roots therein is desired.

Further, in the embodiments of FIGS. 19 – 31, the upper ends of the nose sections are provided with a domed surface such as a cone or pyramid-shaped upper surface. Those cone or pyramidal surfaces serve to direct the roots of plants growing in the containers in radially outwardy and downwardy directions. Additionally, in each of the frame members of the embodiments of FIGS. 19 – 31, the lower end portions of the ribs of the shank sections are so formed in cooperation with the upper surfaces of the nose sections that no effective root entrapment or redirection of the roots of the plants growing in the containers will occur in any direction other than radially outwardly and downwardly of the containers.

Further, in the embodiments of FIGS. 19 – 31, the frame members are made as two-piece members which are secured together to form the completed frame member. Of course, it should be understood that those embodiments can be made as one-piece frame members whee a molding or forming process permits the frame members to be formed as one-piece members with the hereinafter described detailed outer configurations.

The seedling frame member 70 of FIGS. 19 – 23 comprises a nose section 75 and a shank section 76. The nose section 75 is a member having a closed or sealed chamber defined by the sidewall 74a and the top wall 77 thereof. The sidewall 75a is formed as a circumferentially closed wall which is shaped somewhat as the shape of an armor piercing bullet. The upper or top wall 77 of the nose section 75 is formed to have a closed upwardly directed cone-shaped surface 77a, a circular shoulder 77b circumferentially about the cone portion 77a and smoothly blending therewith, and a depending annular projection 77c which depends substantially from the junction of the cone section 77a and the circular shoulder 77b. The outer diameter of the circular shoulder 77b is substantially equal to the outer upper diameter of the bullet-shaped wall 75a of the nose section 75 and is further preferably greater in diameter than the outer diameter of the planting end of the planting tool to be used therewith. The outer diameter of the depending annular projection 77c is substantially equal to the upper inner diameter of the bullet-shaped wall 75a of the nose section 75. Thus, the bullet-shaped wall 75a and the upper wall section 77 of the nose section 75 will fit together substantially as shown in FIG. 20. The sidewall 75a and the upper wall surface 77 may be frictionally retained together to form the completed nose section 75 of the frame member 70, or may be adhesively or otherwise integrally interconnected.

In the embodiment of FIGS. 19 – 23, it is contemplated that the sidewall 75a may be separately molded from the top wall section 77, which in turn may be molded as a one-piece member with the four ribs 76a of the shank section 76. In molding or otherwise forming the various described parts of the frame member 70, the separate parts may be made of the same material, such as a plastics-material such as polystyrene, or where appropriate, different materials may be used for the described two molded parts.

The four ribs, elongated members, or wall sections 76a of the shank section 76 are formed to upstand from the upper surface of the top wall 77 of the nose section 75. The wall sections 76a are slightly arcuate in transverse cross section and are arranged in a horizontally spaced-apart relationship on the circle which may be defined as the junction between the cone-shaped surface 77a and the circular shoulder 77b of the top wall 77 of the nose section 75. Each of the wall sections 76a further includes a vertical radially inwardly extending rib 78. The ribs 78 are substantially uniform in cross-sectional shape in the central and upper portions of the wall sections 76a. The lower portions of the ribs 78 are flared both radially inwardly and circumferentially of the wall sections 76a in a downward direction to merge in smooth curves into the cone surface 77a and to the vertical side edges of the wall sections 76a as may be seen in FIGS. 20 and 23. From the foregoing, it may be seen that the wall sections 76a, including the ribs 78, in combination with the upper surface of the sections 77a and 77b will direct any roots which are growing downwardly in the cartridge member 70 in a radially outward direction at the lower end of the shank section 76. Thus, no surface is defined that may trap or cause a generally downwardly growing root to reverse its direction of growth to an upwardly growing direction. The central and upper uniformly shaped portions of the ribs 78 tend to prevent root spiraling as the roots of a seedling growing in the frame grow radially outwardly sufficiently to meet the wall sections 76a.

As with the previously described embodiments, the frame member 70 includes a sleeve 72 to form the complete planting container of the subject invention. The sleeve 72 firmly encircles the shank section 76 of the frame member 70 and is formed of a thin opaque material, such as polystyrene plastics-material. The lower end of the sleeve 72 terminates a short distance above the upper surface of the circular shoulder 77b of the nose section 75 as may be seen in FIG. 21, to provide four drain or weep openings, such as opening 80 shown in FIG. 21. If the sleeve 72 is formed of a shrink film material the invention contemplates that in the application of the shrink film to the shank section 76, the upper end of the sleeve 72 may be tucked into the upper end of the frame member, such as shown by the dotted line 81 in the FIG. 21. That inward folding of the upper end of the sleeve 72, in shrinking the sleeve 72 on the frame member 70, will serve to firmly hold the upper ends of the wall sections 76a in circular alignment, particularly if those wall sections 76a are relatively thin and fragile.

The construction of FIG. 21 includes a further alternative embodiment, and that is the arrangement of the upper ends of the wall sections 76a in a slightly radially inwardly directed direction. That radially inwardly curving of the upper ends of the wall sections 76a may conveniently be produced during the process of heat shrinking of the sleeve 72 on the frame member when the wall sections 76a are formed of a thermoplastic material. That construction as shown in FIG. 21 produces a restricted open upper end to the container and conveniently serves to prevent accidental dislodgement of a seedling growing in the container if the container is inverted and jarred.

As with the previously described embodiments, the complete container of FIG. 21 is mounted in an upright direction in a greenhouse and filled with soil or a growing medium and the seed of the plant to be grown therein. As the seed germinates and the seedling begins to grow, the roots of the seedling will grow downwardly through the growing medium while the top growth will grow upwardly from the top of the container. As the seedling is growing in the defined container, it is, of course, periodically watered and the weep openings 80 will provide proper drainage of any excess water from the container. As the tap roots of the seedling reach the weep holes 80 and tend to grow outwardly thereof, they will tend to be air pruned at the openings 80.

When growth of the seedling in the container of FIG. 21 reaches a point at which the seedling should be planted in open ground, the sleeve 72 is removed and the frame is inserted in a planting tool, such as the planting tool of FIGS. 10 - 18, with the planting end of the tool abutting the upper surface of the circular shoulder 77b for projection of the frame and root portion of the seedling into the ground, such as shown for example in FIGS. 15 - 18. The sleeve 72 may be made with a pull tab 82 and a weakened line or lines 83 so that a person may grasp the pull tab 82 and tear upwardly to tear open and remove the sleeve 72 from the frame member 70 immediately prior to the planting of the frame member 70 and the seedling growing therein in the open ground.

In the embodiments of FIGS. 24 - 31, the frame member 71 is formed of two parts which when assembled together as shown in FIG. 24 form the complete frame member 71. In this embodiment, it is contemplated that each part of the frame member 71 may be molded as a single member 90, such as shown in FIG. 25. Two members may then be put together, as shown in FIG. 24, to form the completed frame member 71.

Each part 90 comprises an integral assembly of one half of a nose section 91, two upstanding wall sections 92 and one half of an upper ring 93.

The nose section half 91 comprises a sidewall which is semi-circular in transverse cross section and has a cone or bullet-shaped outer sidewall 91e and further includes one full side 91a and two half sides 91b and 91c of a pyramid. The full side 91a and the side halves 91b and 91c of the pyramid smoothly merge at their lower edges into the upper inner wall portion of the bullet-shaped sidewall 91e. The upper edge of the sidewall 91e has sufficient thickness to define a semi-circular shoulder 91d for abutting engagement with the end of a planting tube tool and to extend slightly radially outwardly of the outer wall surface of the tool.

FIGS. 25, 27 and 28 show one way in which the frame halves 90 may be joined together at the nose section halves 91. In the embodiment of FIGS. 24 - 31, only the nose halves 91 are secured together, the ring halves 93 are not secured together, but merely cooperate in an abutting relationship. However, if growth of the seedling in the frame in the open ground would not be effected by the ring halves 93 being secured together, they may be so secured. The joining system of the nose halves 91, as shown, includes the molding of four bosses 94, 95, 96 and 97 on the inner surface of the nose half 91. Bosses 94 and 95 are at the same vertical position on opposite inner wall portions of the nose half 91, and bosses 96 and 97 are at the same vertical position on opposite inner walls of the nose half 91. Boss 94 is provided with a pin projection 94a and boss 95 is provided with a recess 95a, such that when two nose halves 91 are positioned as shown in FIG. 28 the projections 94a will enter the recesses 95a as shown in FIG. 27 when the two nose halves 91 are moved together. In a similar manner, the boss 96 is provided with a recess 96a and the boss 97 is provided with a projection 97a to further interengage in the mating cooperation of two nose halves 91. The two nose halves 91 may be further physically interconnected in the completed frame member 71 in a number of different ways. An appropriate adhesive may be used between the mating edges, or some process such as ultrasonic welding may be used.

The frame member halves 90 must be so formed that when the nose halves 91 are joined together, the mating lines on two sides of the defined pyramid will not admit the roots of a seedling growing in the cartridge between the two nose halves 91.

The ribs or wall sections 92 are substantially triangular in transverse cross section. The lower ends of the two ribs 92 are molded on the nose half 91 to upstand therefrom in a horizontally spaced-apart relationship. The ribs 92 are further arranged so that one side thereof lies substantially tangentially on the semi-circle traced by the radially inner edge of the semi-circular shoulder 91d, and so that the other two sides of the triangular ribs 92 extend from the one side and meet in an apex on one of the edges of the pyramid sidewall 91a. Thus, as may be seen in FIG. 31, the roots of a seedling growing in the container will, in growing downward to the pyramid, be deflected downwardly and radially outwardly, and any root that engages a rib 92 will be deflected on one side or the other of the apex of the rib to continue growing downwardly and radially outwardly. The construction as defined is absent of any surface configuration with might tend to direct any root in an upward direction.

The radially outward sides of the ribs 92 merge at their upper ends into the flat semi-annular outer surface 93a of the semi-circular ring section 93. The ribs 92 are thicker in a radial direction than the ring section 93, and the radially inward portions of the upper ends of the ribs 92 taper in two directions to end in a point at the upper edge of the ring section 93 as may be seen in FIG. 30. At the upper edge of the flat surface 93a, the ring section 93 is provided with a chamfered surface 93b which extends upwardly and radially inwardly to the inner wall of the ring section 93. One end of the ring section 93 is formed with a V-shaped groove and the other end is formed with a complementary V-shaped projection so that when two ring sections 93 are brought together as shown in FIG. 29, the two ring sections will be guided into meeting together in a circle, a shown in FIG. 29.

The sleeve 73 is mounted about the shank section of the frame member 71 substantially as shown in FIG. 26. The lower end of the sleeve 73 terminates a short distance upwardly from the circular shoulder 91d to provide drain or weep holes 98 between the four ribs 92 of a complete frame member 71 circumferentially thereabout. The weep holes 98 function to drain excess water from the seedling container and to permit air pruning of any roots that begin to grow out of those openings. Although the sleeve 73 may be made of a thin elastic material and merely stretched and applied about the shank section of the frame member 71, the embodiment of the sleeve 73 shown in FIGS. 26 and 31 is a shrink flm sleeve. In applying such a shrink film sleeve, a mandrel (not shown) in inserted into the upper end of the frame member 71 to extend into and through the shank section thereof prior to shrinking the shrink film sleeve about the frame member 71. Preferably, the mandrel should have an outer diameter substantially equal to the inner diameter of the ring sections 93 and at least four longitudinally extending V-shaped slots to receive the radially inwardly extending apex portions of the ribs 92. As a normal procedure, the film sleeve before shrinking would be substantially longer than the shank section of the frame member 71 to allow for shrinkage of the sleeve in the longitudinal direction in addition to the desired radial shrinkage. Conventionally, heat for shrinking the film sleeve is initially directed at the lower end of the sleeve 93 adjacent the nose section of the frame member 71 and progressively moved toward and at least to, if not beyond, the upper end of the frame member 71. The sleeve 73 in shrinking about the ribs 92 and against the mandrel will shrink to substantially the configuration shown in cross section in FIG. 31. The upper end portion of the film sleeve 73 will shrink about the ring sections substantially as shown in FIG. 26 and a small annular remnant portion 99 which may remain will be formed against the mandrel. After the shrink film has cooled and the mandrel removed, the seedling container is completed and ready to receive soil and seed of the plant desired to be grown therein. As described for the other embodiments of the invention, the sleeve 73 may be provided with weakening lines and/or finger tabs to aid in removing the sleeve 73 immediately prior to planting the seedling frame by means of a tool such as the tool of FIG. 10.

As an alternative arrangement, the mandrel (not shown) which is inserted into the shank portion of the frame member as a forming member against which the shrink film may shrink, may be provided with a circumferentially continuous arrangement of contiguous V-shaped slots for two reasons; firstly, such a mandrel need not be rotationally indexed relative to a frame prior to insertion of the mandrel into the frame. Secondly, the set shrink film will have an undulating surface between the ribs 92 consisting of a series of longitudinally extending V-shaped ribs.

In the embodiment of FIGS. 32 – 36, the frame member 110 comprises a base section 112 and a plurality of ribs 113. The base section 112 preferably has a substantially circular periphery from which the ribs 113 extend upwardly, an upper surface which is upwardly domed. In a preferred embodiment, the upper surface of the base section 112 is formed to have a four-sided pyramidal shape as shown in the drawing. It is contemplated that the upper surface may also be pyramidal-shaped with more than four sides or may be cone-shaped. The upper surfaace of the base section 112 is further devoid of any openings which might pass water therethrough to avoid a condition where roots of the plant growing in the container might attempt to grow through such openings and be strangled by the peripheral wals of such openings.

The ribs 113 of the frame member 110 as shown are four in number in the preferred embodiment shown in the drawing. In the initial manufactured condition of the frame member 110, the ribs 113 diverge upwardly of the base section 112 as shown in the drawing. Further, each rib 113 is preferably formed of two longitudinally extending side surfaces disposed at an angle of substantially 90° to each other. The ribs 113 are connected to the base section 112 so that the line of convergence of the side surfaces of each of the ribs 113 lies on one of the junction lines of two adjacent sides of the pyramidal upper surface of the base section 112.

As may be seen in FIG. 35, a plurality of frame members 110, as shown and described above, may be nested to produce a compact arrangement for a plurality of frame members 110 in the storage and/or shipment of such frame members 110. If desired, to strengthen the ribs 113 and to aid in holding the sleeve 111 on the ribs 113, the upper end of each rib 113 may be provided with a wall 114 connected transversely of the side surfaces of the ribs 113.

In the nestable form of the frame member 110, the material and construction of the frame member 110 should be such that the ribs 113 can be brought into substantial parallel alignment when the tubular sleeve 111 is mounted thereabout. The sleeve 111 is preferably formed of a thin film-like material. One available suitable material which I have utilized is bi-axially oriented polystyrene of a thickness of about 3 mil. Because such a plastic film material will have some resiliency, the ribs 113 may be slightly bowed outwardly when the sleeve 111 is circumferentially mounted about the ribs 113 as shown in FIG. 36. Further, when the sleeve is formed of an oriented plastics film, some heat shrinking of the sleeve may be done to produce a firm engagement and support of the sleeve 111 by the ribs 113.

If necessary to prevent light from retarding root growth, the sleeve 111 may further be formed of an opaque material, or it may be rendered opaque by some appropriate coating. Further, if desired or necessary, to provide firm contact between the ribs 113 and the sleeve 111, the sleeve 113 may be welded or otherwise adhesively secured to the ribs 113. However, any bond between the sleeve 111 and the ribs 113 should be such that when the plant, which has been grown in the container to the seedling stage, is to be planted in the open ground, that bond can easily be broken with the intended removal of the sleeve 111.

The sleeve 111 is further mounted on the frame member 110 so that the lower edge of the sleeve 111 terminates a sufficient distance upwardly from the peripheral edge of the base section 112 to provide adequate drain openings 115 at the lower outer periphery of the container. In the above-described arrangement of the container of the subject invention, a growing medium may be placed therein and a seedling, such as seedling 116 shown in FIG. 36, may be grown therein from a seed. As the seed germinates and as the growing medium is watered and otherwise kept moist, the roots of the growing seedling will grow outwardly and downwardly throughout the growing medium. Any roots engaging the inner surface of the sleeve 111 and possibly beginning to spiral will, upon engaging a rib 113, be directed downwardly to avoid root spiraling. As the roots reach the upper surface of the base section 112, the pyramidal portion surface will direct the roots radially outwardly and downwardly toward the drainage openings 115. As the roots reach the drainage openings 115 they may be appropriately air pruned. It may be seen from the drawing and the foregoing description that no wall surfaces exist in the container of the invention which are likely to cause the root of a seedling to be directed in an upward direction.

The sleeve 111 is further provided with means for opening the sleeve to remove it from the frame member 110. One suitable opening means is shown in FIG. 36 and comprises a weakening line or strip 117 which extends longitudinally of the sleeve 111 and terminates at its lower end in an appropriate finger gripping tab 118. If the tubular sleeve is formed into the tube shape from a sheet material, the abutting or lapped edges of the sleeve may be sealed with a pressure sensitive waterproof tape leaving a projecting end that can be pulled to remove the tape and open and remove the sleeve.

When the seedling 116 has grown to a size that it is ready for planting in the open ground, the sleeve 111 is removed and the frame member 110 is retained about the root mass of the seeding to avoid a falling apart of the root mass or a disorganization of its normal root pattern. Using a dibble, a hole may be made in the open ground and the frame member 110 with the seedling growing therein may be pushed into the hole to plant the seedling 116 with a minimum of disturbance of the root mass. If desired, a ground penetrating nose element may be applied to the underside of the base section 112 to form a container such as shown in the previously described embodiments of FIGS. 19 – 31, and the frame member 110 with the growing seedling therein may then be projected into the open ground without the use of a dibble. Further, in such arrangements, a planting tool such as described above may also be used to plant such a modified container.

FIGS. 37 – 39 show a different embodiment of the planting tool of FIGS. 10 – 14, and particularly show a tool differing from the embodiment of FIGS. 10 – 14 in having a slot which permits the top growth of the plant to remain exteriorly of the tool when the frame member is inserted in the tool.

The tool 120 of FIGS. 37 – 39 comprises a central shank section 121, an upper handle section 122, and a lower planting section 123.

The planting section 123 is formed of a suitable material such as steel and is generally tubular. The upper end of the planting section 123 is secured to the lower end of the shank section 121 by means of the fasteners 124. One longitudinal section of the planting section 123 is provided with a slot 125. The internal diameter of the planting section 123 is substantially equal to the outer diameter of the shank sections of the frame members 10, 11, 12, 70 or 71 previously described and has an outer diameter slightly less than the outer diameter of the shoulders on the upper ends of the nose sections of those frame members. The length of the planting section 123 from the lower end thereof to the upper end of the slot 125 is preferably about twice as long as the shank sections or ribs of the various described frame members.

The planting section 123 is further provided with a brace and stop member 126. The brace and stop member 126 is formed as a plate in a generally C-shape, as shown in FIG. 39. The open side of the member 126 coincides with the slot 125 to avoid restricting the open area of the slot 125. As a brace member, the member 126 functions firstly to brace the wall of the section 123 against spreading or opening of the slot 125 in the use of the tool. Conveniently, the member 126 may be welded about the planting section 123. The member 126 further functions as a lower brace for the foot rest 127. The foot rest 127 is secured to the planting section 123 and extends radially outwardly from the side opposite from that having the slot 125. The foot rest 127 further includes a vertical web secured to the upper surface of the member 126. The distance from the extending end of the planting section 123 to the member 126 is substantially equal to the length of the shank or rib sections of the frame members previously described. Thus, it may be seen that the member 126 further serves as a planting stop to conveniently indicate and stop planting of a frame member when the member 126 engages the ground. From the foregoing it may be seen that the tool 120 is used by a person to plant the previously described frame members by holding the handle section 122, resting one's foot on the foot rest 127 and pushing the lower end of the planting section 123 below the member 126 into the ground. Once a frame member has been planted, an upward pull on the handle section 122 will withdraw the lower end of the planting section 123 from the ground and the ground about the planted frame member and the plant growing therein may be easily tamped by a person's feet.

In a manner similar to that described for the tool embodiment of FIGS. 10 – 14, the frame member of one of the containers of the subject invention, absent its sleeve, is inserted into the extending end of the planting section 123. The preferred arrangement for inserting a frame is shown in FIGS. 40 and 41. The frame member 71 of FIGS. 24 – 31 is shown by way of example in FIGS. 40 and 41. The nose section 91 is shown as slightly modified in FIGS. 40 and 41 in the provision of an integral pin 130 at the tip of the nose section 91. That pin may conveniently be used to vertically align or key the container in an appropriate greenhouse tray or rack. It should be noted in FIG. 40 that the container is absent its sleeve and that the root mass and growing medium 131 of the plant 132 are contained and supported by the ribs 92 of the frame member 71. Note should further be made of the ring 93 at the upper end of the ribs 92. Preferably, in the insertion of the frame member 71 into the planting section 123 of the tool 120, the frame member 71 is held at an angle to the longitudinal axis of the tool 120 so that one side of the ring 93 may engage the inner edge of the lower or extending end of the planting section 123, opposite from the side having the slot 125, with the stem of the plant 132 extending through the slot 125 and with the top growth of the plant 132 positioned exteriorly of the planting section 123 substantially as shown in FIG. 40. After that initial cooperation between the frame member and the tool, the extending end of the frame member 71 is raised to bring the longitudinal axis of the frame member 71 coincident with the longitudinal axis of the planting section 123. The stem of the plant 132 will then angle outwardly of the slot 125 in a curve of a generally long radius of curvature, somewhat as shown in FIG. 41. The frame member 71 is then axially moved within the planting section 123 until the lower end of the planting section 123 abuts the shoulder on the upper end of the nose section 91 of the frame member 71 as shown in FIG. 41. Because of the sliding action that occurs between the walls of the slot 125 and the stem of the plant 132, it is preferred that the edges of the slot 125 be rounded to avoid any sharp corners which might nick the stem of the plant 132. The lower end of the slot 125 at 125a is preferably rounded and slightly wider than the slot 125 to aid in the insertion of the frame member 71 and plant 132 as described. Obviously, the slot 125 should have a width slightly greater than the diameter of the stem of the plant 132 intended to be planted with the tool 120.

When the frame member 71 is inserted into the planting section 123 as shown in FIG. 41, the ring 93 will be in substantial longitudinal alignment with the member 126 relative to the planting section 123. As shown in FIGS. 37 and 38, the inner wall of the planting section 123 at that longitudinal position is provided with a radially inwardly extending projection 133. The ring 93 will slide onto the projection 133 and the frame member 71 will thereby be releasably held within the planting tool 120. If the ring 93 is constructed so that it is frangible under the application of a force directed radially inwardly thereagainst, the projection 133 may also be conveniently used to fracture the ring 93 preparatory to the planting of the frame member 71 in the ground.

After the frame member 71 has been inserted in the planting tool 120 as described, the frame member 71 with the plant 132 growing therein may be planted in the ground by vertically holding the tool 120 and projecting the lower end of the planting section 123 vertically into the ground. As described, the planting tool 120 may then be withdrawn, leaving the frame member 71 planted in the ground, and the ground about the plant 132 can be tamped by a person's foot to complete the planting process.

FIGS. 42 – 44 show a frame and plant insertion process similar to that described relative to FIGS. 40 and 41 except that in the arrangement of FIGS. 42 – 44 the sleeve 134 has not been removed before the frame member is inserted into the planting section 123 of the tool 120, but is removed contemporaneously with the insertion operation. To permit the sleeve to be removed from the container as the frame is inserted in the planting tool, the upper end of the sleeve 134 is formed to have an annular recess between the sleeve and the ring 93. Thus, the sleeve 134 is formed so that the internal diameter of the upper end thereof is greater than the outer diameter of the lower end of the planting section 123 of the tool 120. Further, the upper edge of the sleeve 134 may be provided with notches or weakened areas 135 which are at the upper ends of weakened lines 136 extending longitudinally of the sleeve 134. Thus, as shown in FIGS. 42 – 44, insertion of the ring 93 of the frame member into the lower end of the planting section 123 as described relative to FIGS. 40 and 41 will cause the planting section 123 to enter between the sleeve 134 and the frame of the container to progressively fracture the sleeve 134 as the frame member is inserted into the tool. Upon complete insertion of the frame member into the tool, the sleeve 134 will be completely fractured and will fall away from the inserted frame member to permit the frame member and plant growing therein to be planted in the ground absent the sleeve member.

Having described the invention, it is to be understood that changes can be made in the described embodiments by a person skilled in the art within the scope of the hereinafter following claims.

I claim:

1. A planting method for a plurality of plants such as trees comprising the steps of: providing a plurality of containers each of which comprises a seedling cartridge having a base section with a horizontally extending shoulder and with spaced-apart elongated members extending upwardly from said base and with a thin plastics film disposed about said elongated members, placing a growing medium and plant seed in each of said plurality of containers and growing said plants to a seedling stage therein, thereafter transporting said plurality of seedling cartridges to an open ground planting site, removing the film from one of said seedling cartridges and inserting said seedling cartridge in a planting tool having a tubular section capable of accepting said seedling cartridge with the elongated members longitudinally therein and with the end of said tubular section abutting the upper side of said shoulder and about said base section, pushing said tubular section into the ground until said elongated members are within the ground, and withdrawing said tubular section to leave said seedling cartridge with said seedling growing therein in the ground, and thereafter repeating the foregoing steps from the step of removing the film from one of said seedling cartridges.

2. A planting method for a plurality of plants such as trees comprising the steps of: providing a plurality of containers each of which comprises a seedling cartridge having a pointed tip section with spaced-apart elongated members extending upwardly therefrom and with a thin plastics film disposed about said elongated members, placing a growing medium and plant seed in each of said plurality of containers and growing said plants to a seedling stage therein, thereafter transporting said plurality of seedling cartridges to an open ground planting site, removing the film from one of said seedling cartridges and inserting said seedling cartridge in a planting tool having a tubular section capable of accepting said seedling cartridge with the elongated members and the top growth of the seedling longitudinally therein and with the end of said tubular section abutting the rearward end of the tip section of said seedling cartridge, pushing said tubular section into the ground until said elongated members are within the ground, and withdrawing said tubular section to leave said seedling cartridge in the ground.

3. A planting method for a plurality of plants such as trees comprising the steps of: providing a plurality of containers each of which comprises a seedling cartridge having a pointed tip section with spaced-apart elongated members extending upwardly therefrom and with a thin plastics film disposed about said elongated members, placing a growing medium and plant seed in each of said plurality of containers and growing said plants to a seedling stage therein, thereafter transporting said plurality of seedling cartridges to an open ground planting site, removing the film from one of said seedling cartridges and inserting said seedling cartridge in a planting tool having a tubular section capable of accepting said seedling cartridge with the elongated members longitudinally therein and with the end of said tubular section abutting the rearward end of the tip section of said seedling cartridge, pushing said tubular section into the ground until said elongated members are within the ground, and withdrawing said tubular section to leave said seedling cartridge with said seedling growing therein in the ground, and thereafter repeating the foregoing steps from the step of removing the film from one of said seedling cartridges.

4. In a planting method as defined in claim 3, further providing said planting tool as an elongated member capable of convenient end-over-end rotation by a person with said tubular section at one end thereof and with a tamping plate at the other end thereof, and after the step of withdrawing said tubular section from the ground the further steps of turning said tool over and tamping the ground about the seedling cartridge in the ground, and thereafter repeating the foregoing steps from the step of removing the film from one of said seedling cartridges.

5. A planting tool for inserting a seedling container in the ground in a planting operation wherein said seedling container comprises a bottom nose section having an annular shoulder formed on the upper end thereof and a shank extending upwardly from said nose section radially within said shoulder and a growing plant in said container having a stem and top growth extending upwardly therefrom, said tool comprising an elongated member, one end of said elongated member comprising a tubular section having an internal diameter substantially equal to the outer diameter of said shank section of said container and an outer diameter no greater than the outer diameter of said shoulder of said nose section, said tubular section having an internal length substantially greater than the said shank section, one longitudinally extending portion of said tubular section having a slot extending to the extending end of said tubular section, said slot having a width greater than the diameter of the stem of said plant and a width substantially less than the outer diameter of said shank section of said container and a length substantially greater than the length of said shank section of said container.

6. In combination, a plant container and a planting tool for inserting said plant container in the ground in a planting operation, said plant container comprising a base having a substantially horizontally extending shoulder and a skeletal shank section extending upwardly from said base radially within said shoulder, wherein said container is capable of holding a plant therein with a growing medium and root mass within said skeletal shank section and with a stem and top growth extending upwardly therefrom, said tool comprising an elongated member, one end of said elongated member comprising a tubular section having an internal diameter no less than the outer diameter of said skeletal shank section of said container and an outer diameter no greater than the radially outward end of said shoulder, said tubular section having an internal length substantially greater than the length of said skeletal shank section, one longitudinally extending portion of said tubular section having a slot extending to the extending end of said tubular section, said slot having a width greater than the diameter of the stem of said plant and substantially less than the outer diameter of said skeletal shank section of said container and a length substantially greater than the length of said skeletal shank section of said container, said skeletal shank section of said container extending within said tubular section with the extending end of said tubular section in axial abutment with said shoulder and with the stem of any plant in said container extending through said slot with the top growth exteriorly thereof.

7. In combination, a plant container and a planting tool for inserting said plant container in the ground in a planting operation, said plant container comprising a base having a substantially horizontally extending shoulder and a shank section extending upwardly from said base radially within said shoulder, wherein said container is capable of growing a plant therein with a growing medium and root mass within said shank section and with a stem and top growth extending upwardly therefrom, a ring formed on the upper end of said shank section, said tool comprising an elongated member, one end of said elongated member comprising a tubular section having an internal diameter no less than the outer diameter of said shank section and said ring of said container and an outer diameter no greater than the radially outward end of said shoulder, said tubular section having an internal length substantially greater than the length of said shank section, one longitudinally extending portion of said tubular section having a slot extending to the extending end of said tubular section, said slot having a width greater than the diameter of the stem of said plant and substantially less than the outer diameter of said shank section of said container and a length substantially greater than the length of said shank section of said container, said shank section and said ring of said container extending within said tubular section with the extending end of said tubular section in axial abutment with said shoulder, and an internal projection formed within said tubular section at substantially the longitudinal position of said ring therein, said projection having a radial extent sufficient to frictionally retain said ring and said shank section within said tubular section.

8. In combination, a plant container and a planting tool for inserting said plant container in the ground in a planting operation, said plant container comprising a base having a substantially horizontally extending shoulder and a shank section extending upwardly from said base radially within said shoulder, wherein said container is capable of growing a plant therein with a growing medium and root mass within said shank section and with a stem and top growth extending upwardly therefrom, a ring formed on the upper end of said shank section, said tool comprising an elongated member, one end of said elongated member comprising a tubular section having an internal diameter no less than the outer diameter of said shank section and said ring of said container and an outer diameter no greater than the radially outward end of said shoulder, said tubular section having an internal length substantially greater than the length of said shank section, one longitudinally extending portion of said tubular section having a slot extending to the extending end of said tubular section, said slot having a width greater than the diameter of the stem of said plant and a length substantially greater than the length of said shank section of said container, said shank section and said ring of said container extending within said tubular section with the extending end of said tubular section in axial abutment with said shoulder, and an internal projection formed within said tubular section at substantially the longitudinal position of said ring therein, said projection having a radial extent sufficient to frictionally retain said ring and said shank section within said tubular section, said ring being formed to be frangible responsive to a force directed radially inwardly thereof, and said projection extending radially inwardly sufficiently to fracture said ring.

9. A container for planting and growing a plant, said container comprising a frame member and a sleeve, said frame member comprising a base section, a plurality of ribs secured in a spaced-apart relationship and disposed circumferentially of said base section to upstand therefrom, said sleeve formed in a substantially tubular shape from thin flexible material, said sleeve being mounted about and supported for substantially the full length thereof by said ribs to define said container in cooperation with said frame member, the lower edge of said sleeve being spaced from the periphery of said base section to provide drainage openings in cooperation therewith, and said base section being provided with an annular flange extending radially outwardly of said ribs.

10. A container for planting and growing a plant, said container comprising a frame member and a sleeve, said frame member comprising a base section shaped as a closed surface devoid of any openings capable of passing water therethrough, a plurality of ribs secured in a spaced-apart relationship and disposed circumferentially of said base section to upstand therefrom, said sleeve formed in a substantially tubular shape from thin flexible imperforate material, said sleeve being mounted about and supported for substantially the full length thereof by said ribs to define said container in cooperation with said frame member, the lower edge of said sleeve being spaced from the periphery of said base section to provide drainage openings in cooperation therewith.

11. A container for planting and growing a plant as defined in claim 10, wherein said closed surface of said base section is domed upwardly to define a root directing surface extending downwardly and radially outwardly toward the periphery of said base section.

12. A container for planting and growing a plant as defined in claim 11 wherein said closed surface is cone-shaped.

13. A container for planting and growing a plant as defined in claim 11, wherein said closed surface is pyramidal.

14. A container for planting and growing a plant as defined in claim 13, wherein said pyramidal surface is four-sided, said plurality of ribs being four in number, and each of said ribs being positioned on the periphery of said base section to intersect a line of intersection of two adjacent sides of said four-sided pyramidal surface.

15. A container for planting and growing a plant as defined in claim 14 wherein each of said ribs is formed to have two longitudinal sides which converge radially inwardly of said container substantially to an axially extending line, the lower end of which intersects said line of intersection of two adjacent sides of said four-sided pyramidal surface.

16. A container for planting and growing a plant as defined in claim 10, wherein one longitudinal strip section of said sleeve includes means for removing said sleeve from said ribs.

17. A container for planting and growing a plant as defined in claim 16, wherein said last mentioned means comprises a frangible tear strip and a finger gripping tab at one end of said frangible tear strip.

18. A container for planting and growing a plant as defined in claim 10, wherein said sleeve is formed of a heat shrinkable plastics film material and is partially heat shrunk about said ribs for embracing engagement therewith.

19. A container for planting and growing a plant as defined in claim 10, wherein said frame member in initial condition absent said sleeve is shaped with said ribs being inclined upwardly and outwardly of the longitudinal axis of said frame member to permit nesting of substantially identically formed frame members absent said sleeve.

20. A container for planting and growing a plant, said container comprising a frame member and a sleeve, said frame member comprising a base section shaped as a closed surface devoid of any openings capable of passing water therethrough, a plurality of ribs secured in a spaced-apart relationship and disposed circumferentially of said base section to upstand therefrom, said sleeve formed in a substantially tubular shape from thin flexible material, said sleeve being mounted about and supported for substantially the full length thereof by said ribs to define said container in cooperation with said frame member, the lower edge of said sleeve being spaced from the periphery of said base section to provide drainage openings in cooperation therewith, and said base section being provided with an annular flange extending radially outwardly of said ribs.

21. A planting container construction comprising a base having a substantially horizontally extending peripheral shoulder, means for containing the growing medium and roots of a plant on said base and radially within said peripheral shoulder with the top growth of the plant extending thereabove, said means comprising a skeletal frame secured to and upstanding from said base and a sleeve formed from a thin plastics material and encircling said skeletal frame and supported by said skeletal frame for substantially the full length of said sleeve, means on one side of said sleeve for longitudinally opening and removing said sleeve from said skeletal frame, and said shoulder having a radial width sufficient to receive the lower end of a planting tool in vertical abutment thereon and with a circumferential portion of said shoulder extending radially outwardly of the outer wall surface of said planting tool, whereby said shoulder opens a hole in the ground radially greater than said planting tool upon insertion of the planting tool into the ground with said container construction therein.

22. A planting container construction comprising a base having a substantially horizontally extending peripheral shoulder, said base shaped as a closed surface devoid of any openings capable of passing water therethrough, means for containing the growing medium and roots of a plant on said base and radially within said peripheral shoulder with the top growth of the plant extending thereabove, said means comprising a skeletal frame secured to and upstanding from the said base and a sleeve encircling said frame, and said shoulder having a radial width sufficient to receive the lower end of a planting tool in vertical abutment thereon and with a circumferential portion of said shoulder extending radially outwardly of the outer wall surface of said planting tool, whereby said shoulder opens a hole in the ground radially greater than said planting tool upon insertion of the planting tool into the ground with said container construction therein, said closed surface of said base radially within said shoulder being domed upwardly to define a root directing surface extending downwardly and radially outwardly toward said shoulder, said closed surface being pyramidal in shape, said pyramidal surface being four-sided, said skeletal frame comprising four ribs, and each of said ribs being positioned on said base adjacent the radially inward side of said shoulder and circumferentially at a position intersecting a line of intersection of two adjacent sides of said four-sided pyramidal surface.

23. A planting container construction as defined in claim 22, wherein each of said ribs is formed to have two longitudinal sides which converge radially inwardly of said container construction substantially to an axially extending line, the lower end of which intersects said line of intersection of two adjacent sides of said four-sided pyramidal surface.

24. A planting container construction as defined in claim 23, wherein said sleeve includes means for removing said sleeve from said ribs.

25. A container for growing a seedling and for insertion in the ground in a planting operation, said container comprising a bottom nose section and a hollow shank section connected to and extending upwardly therefrom, said nose section presenting a ground penetrating tip configuration, and said shank section including removable wall means for laterally exposing a substantial area of the growing medium and root area of any seedling growing in said container immediately prior to any insertion of said container in the ground in a planting operation, said shank section comprising a plurality of spaced-apart elongated members extending longitudinally of said shank section, and said removable wall means comprising a tubular sleeve member formed of a thin flexible plastics film in encircling contact with and supported by said elongated members.

26. A container as defined in claim 25, wherein said plastics film comprises a black opaque plastics film.

27. A container as defined in claim 25, wherein said tubular sleeve member is further formed of a heat shrinkable plastics film and is heat shrunk about said elongated members.

28. A container as defined in claim 25, wherein said plurality of elongated members comprise four elongated members disposed about and extending upwardly from the upper end of said nose section in a substantially parallel equally spaced-apart relationship..

29. A container as defined in claim 28, wherein each of said elongated members is curved in transverse cross section and lies within a circle smaller in diameter than the outer diameter of the upper end of said nose section.

30. A container as defined in claim 29, wherein the upper end of said nose section radially outwardly of said circle comprises an annular shoulder formed to receive a tubular planting tool thereon for inserting said container in the ground.

31. A container as defined in claim 29, and shoulders integrally formed on each side of the upper ends of said elongated members and said shoulders extending circumferentially of said circle in which said curved elongated members lie, and said shoulders having lengths such that the extending ends of adjacent shoulders are spaced-apart a predetermined distance.

32. A container as defined in claim 25, a plurality of fingers integrally formed on said elongated members intermediate the ends thereof and positioned to cooperate with the growing medium and roots of any seedling growing in said container to substantially hold said growing medium and the roots of any seedling growing in said container against movement of said growing medium and any seedling growing in said container out of the upper end of said container.

33. A container as defined in claim 25, wherein said nose section is formed to have an uninterrupted spiral slot extending from the top of said nose section to a point substantially adjacent the tip thereof.

34. A container as defined in claim 33, wherein the interior wall of said nose section is shaped to direct the tap root of a seedling growing in said container substantially downwardly and out of the lower end of said slot.

35. A container as defined in claim 33, wherein said shank section comprises a plurality of spaced-apart elongated members extending longitudinally of said shank section, and said removable wall means comprises a tubular sleeve member formed of a heat shrinkable plastics film, said tubular sleeve member encircling said elongated members and extending downwardly over said nose section a predetermined distance from the tip of said nose section, and said tubular sleeve member being heat shrunk about said elongated members and said nose section.

36. A container as defined in claim 33, wherein said shank section comprises a plurality of spaced-apart elongated members extending longitudinally of said shank section, said elongated members disposed on the upper end of said nose section and extending upwardly therefrom in a spaced-apart relationship, said elongated members further disposed on said upper end of said nose section on opposite sides of the upper end of said uninterrupted spiral slot to provide a continuous uninterrupted space between said elongated members and the opposed walls of said uninterrupted spiral slot from the upper end of said elongated members to said point substantially adjacent the tip of said nose section.

37. A container for growing a seedling and for insertion in the ground in a planting operation, said container comprising a bottom nose section and a hollow shank extending upwardly therefrom, said nose section being formed to present a ground penetrating outer configuration, and said shank section including removable wall means for laterally exposing a substantial area of the growing medium and root area of any seedling growing in said container immediately prior to any insertion of said container in the ground in a planting operation, said shank section further including a plurality of spaced-apart elongated members extending longitudinally of said shank section, said removable wall means comprising a tubular sleeve member encircling said elongated members, said plurality of elongated members comprising four elongated members disposed about and extending upwardly from the upper end of said nose section in a substantially parallel equally spaced-apart relationship with the radially outward sides of said members lying on a circle smaller in diameter than the outer diameter of the upper end of said nose section and substantially equal in diameter to the internal diameter of said tubular sleeve member, and the upper surface of said nose section within said circle comprising an upwardly domed closed surface.

38. A container as defined in claim 37, wherein said tubular sleeve member terminates at the lower end thereof a certain distance above the upper end of said nose section to provide drainage openings between the lower end of said tubular sleeve member and the upper end of said nose section and between the lower ends of said four elongated members.

39. A container as defined in claim 38, a ring on the upper ends of said elongated members, and the upper end of said tubular sleeve member extending circumferentially about said ring.

40. A container as defined in claim 39, said tubular sleeve member being formed of a heat shrinkable plastics film, and said sleeve being heat shrunk about radially inward portions of said ring.

41. A container as defined in claim 40, said sleeve being heat shrunk about said elongated member with portions thereof disposed radially inwardly of said circle.

42. A container as defined in claim 37, in wherein said upwardly domed closed surface is cone-shaped, and the inner surfaces of said four elongated members are each tapered downwardly and radially inwardly to substantially a point on the surface of said cone-shaped surface.

43. A container for growing a seedling and for insertion in the ground in a planting operation, said container comprising a bottom nose section and a hollow shank section extending upwardly therefrom, said nose section being formed to present a ground penetrating outer configuration, and said shank section including removable wall means for laterally exposing a substantial area of the growing medium and root area of any seedling growing in said container immediately prior to any insertion of said container in the ground in a planting operation, said shank section further including a plurality of spaced-apart elongated members extending longitudinally of said shank section, said removable wall means comprising a tubular sleeve member encircling said elongated members, said plurality of elongated members comprising four elongated members disposed about and extending upwardly from the upper end of said nose section in a substantially parallel equally spaced-apart relationship with the radially outward sides of said members lying on a circle smaller in diameter than the outer diameter of the upper end of said nose section, the upper section of said nose section within said circle comprising an upwardly domed closed surface, and said upwardly domed closed surface being substantially pyramidal-shaped with the lines of intersection of the sides of the pyramidal-shaped surface radially intersecting the radially inward surfaces of said elongated members.

44. A container as defined in claim 43, wherein said elongated members are substantially triangular in transverse cross section with two adjacent sides of each of said elongated members meeting on a vertical line in a vertical plane through one of the lines of intersection of the sides of the pyramidal-shaped surface.

45. A container for growing a seedling and for insertion in the ground in a planting operation, said container comprising a bottom nose section and a hollow shank section extending upwardly therefrom, said nose section being formed to present a ground penetrating outer configuration, and said shank section including removable wall means for laterally exposing a substantial area of the growing medium and root area of any seedling growing in said container immediately prior to any insertion of said container in the ground in a planting operation, said shank section further including a plurality of spaced-apart elongated members extending longitudinally of said shank section, said removable wall means comprising a tubular sleeve member encircling said elongated members, said plurality of elongated members comprising four elongated members disposed about and extending upwardly from the upper end of said nose section in a substantially parallel equally spaced-apart relationship with the radially outward sides of said members lying on a circle smaller in diameter than the outer diameter of the upper end of said nose section, and the upper surface of said nose section within said circle comprising an upwardly domed closed surface, said tubular sleeve member terminating at the lower end thereof a certain distance above the upper end of said nose section to provide drainage openings between the lower end of said tubular sleeve member and the upper end of said nose section and between the lower ends of said four elongated members, a ring on the upper ends of said elongated members, the upper end of said tubular sleeve member extending circumferentially about said ring, and said ring being a split ring.

* * * * *